US012061989B2

(12) United States Patent
Vasisht et al.

(10) Patent No.: US 12,061,989 B2
(45) Date of Patent: Aug. 13, 2024

(54) MACHINE LEARNING ARTIFICIAL INTELLIGENCE SYSTEM FOR IDENTIFYING VEHICLES

(71) Applicant: Capital One Services, LLC, McLean, VA (US)

(72) Inventors: Sunil Subrahmanyam Vasisht, Flowermound, TX (US); Geoffrey Dagley, McKinney, TX (US); Qiaochu Tang, The Colony, TX (US); Sean Reddy, New York, NY (US); Jason Richard Hoover, Grapevine, TX (US); Stephen Michael Wylie, Carrollton, TX (US); Micah Price, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 841 days.

(21) Appl. No.: 17/187,322

(22) Filed: Feb. 26, 2021

(65) Prior Publication Data

US 2021/0256320 A1 Aug. 19, 2021

Related U.S. Application Data

(63) Continuation of application No. 16/253,599, filed on Jan. 22, 2019, now Pat. No. 10,936,915, which is a
(Continued)

(51) Int. Cl.
*G06K 9/62* (2022.01)
*G06F 16/583* (2019.01)
(Continued)

(52) U.S. Cl.
CPC ........... *G06N 3/084* (2013.01); *G06F 16/583* (2019.01); *G06F 18/214* (2023.01); *G06F 18/24* (2023.01);
(Continued)

(58) Field of Classification Search
CPC .. G06V 20/54; G06V 10/774–10/7753; G06V 2201/10; G06V 10/82;
(Continued)

(56) References Cited

U.S. PATENT DOCUMENTS 8,774,465 B2  7/2014 Christopulos et al.
8,873,807 B2  10/2014 Calman et al.
(Continued)

FOREIGN PATENT DOCUMENTS

CN    105160333 B    8/2018

OTHER PUBLICATIONS

Linjie Yang et al., "A Large-Scale Car Dataset for Fine-Grained Categorization and Verification", CVPR2015, Copyright 2015, pp. 3973-3981. (Year: 2015).*
(Continued)

*Primary Examiner* — Brian Werner
(74) *Attorney, Agent, or Firm* — FINNEGAN, HENDERSON, FARABOW, GARRETT & DUNNER LLP

(57) ABSTRACT

An artificial intelligence system for identifying attributes in an image. The system may include a processor in communication with a client device; and a storage medium. The storage medium may store instructions that, when executed, configure the processor to perform operations including: extracting first features; categorizing the first images in a first group or a second group; modifying first metadata associated with each image in the first images to include a binary label; calculating a classification function; classifying a second plurality of images using the classification function; extracting second features from the second images classified in the first group; categorizing the second images in the first group by attribute; calculating an attribute identification function that identifies attributes of the second
(Continued)

images; and identifying at least one attribute associated with a client image using the attribute identification function, the client image being received from the client device.

20 Claims, 17 Drawing Sheets

Related U.S. Application Data continuation of application No. 15/948,286, filed on Apr. 9, 2018, now Pat. No. 10,235,602, which is a continuation of application No. 15/915,947, filed on Mar. 8, 2018, now Pat. No. 10,140,553.

(51) Int. Cl.
| | |
|---|---|
| G06F 18/214 | (2023.01) |
| G06F 18/24 | (2023.01) |
| G06N 3/02 | (2006.01) |
| G06N 3/045 | (2023.01) |
| G06N 3/048 | (2023.01) |
| G06N 3/084 | (2023.01) |
| G06N 20/00 | (2019.01) |
| G06V 10/10 | (2022.01) |
| G06V 10/44 | (2022.01) |
| G06V 10/764 | (2022.01) |
| G06V 10/774 | (2022.01) |
| G06V 20/20 | (2022.01) |
| G06F 18/23 | (2023.01) |
| G06N 5/01 | (2023.01) |
| G06N 20/20 | (2019.01) |

(52) U.S. Cl.
CPC ............... *G06N 3/02* (2013.01); *G06N 3/045* (2023.01); *G06N 3/048* (2023.01); *G06N 20/00* (2019.01); *G06V 10/17* (2022.01); *G06V 10/454* (2022.01); *G06V 10/764* (2022.01); *G06V 10/774* (2022.01); *G06V 20/20* (2022.01); *G06F 18/23* (2023.01); *G06N 5/01* (2023.01); *G06N 20/20* (2019.01); *G06V 2201/10* (2022.01)

(58) Field of Classification Search
CPC . G06F 18/214–18/2155; G06F 16/583; G06N 3/08–3/0985; G06N 20/00–20/20
See application file for complete search history.

(56) References Cited

U.S. PATENT DOCUMENTS

| 8,965,112 | B1 | 2/2015 | Ibarz et al. |
| 9,792,530 | B1 | 10/2017 | Wu et al. |
| 9,842,496 | B1 | 12/2017 | Hayward |
| 2004/0258313 | A1 | 12/2004 | Jones et al. |
| 2005/0249418 | A1 | 11/2005 | Lancieri |
| 2006/0030985 | A1 | 2/2006 | Lawida et al. |
| 2006/0104504 | A1 | 5/2006 | Sung |
| 2008/0310737 | A1 | 12/2008 | Han et al. |
| 2009/0273677 | A1 | 11/2009 | Huynh-Thu et al. |
| 2010/0080440 | A1 | 4/2010 | Yamada |
| 2010/0158356 | A1* | 6/2010 | Ranzato ............... G06F 18/214 382/159 |
| 2010/0322534 | A1 | 12/2010 | Bolme et al. |
| 2012/0230548 | A1 | 9/2012 | Calman et al. |
| 2013/0070986 | A1 | 3/2013 | Peleg et al. |
| 2013/0261880 | A1 | 10/2013 | Cho et al. |
| 2014/0266803 | A1 | 9/2014 | Bulan et al. |
| 2015/0019204 | A1 | 1/2015 | Simard et al. |
| 2015/0036919 | A1 | 2/2015 | Bourdev et al. |
| 2015/0100448 | A1 | 4/2015 | Binion et al. |
| 2015/0242708 | A1 | 8/2015 | Duan et al. |
| 2015/0248586 | A1 | 9/2015 | Gaidon et al. |
| 2015/0310365 | A1 | 10/2015 | Li et al. |
| 2016/0070986 | A1 | 3/2016 | Childovskii et al. |
| 2016/0259995 | A1 | 9/2016 | Ishii et al. |
| 2017/0024641 | A1 | 1/2017 | Wierzynski |
| 2017/0196497 | A1 | 7/2017 | Ray et al. |
| 2017/0221229 | A1 | 8/2017 | Perrier et al. |
| 2017/0228616 | A1 | 8/2017 | Tasdizen et al. |
| 2017/0294118 | A1 | 10/2017 | Chen et al. |
| 2017/0329755 | A1 | 11/2017 | Liu et al. |
| 2018/0025392 | A1 | 1/2018 | Helstab |
| 2018/0129893 | A1 | 5/2018 | Son et al. |

OTHER PUBLICATIONS

Gao, Y., & Lee, H. J. (Dec. 2015). Vehicle make recognition based on convolutional neural network. In Information Science and Security (ICISS), 2015 2nd International Conference on (pp. 1-4). IEEE.

Ester et al., A density-based algorithm for discovering clusters in large spatial database with noise (Ester 96), Proceedings of $2^{nd}$ Int'l Conf. on Knowledge and Data Mining, 1996) (Year: 1996).

* cited by examiner

MACHINE LEARNING ARTIFICIAL INTELLIGENCE SYSTEM FOR IDENTIFYING VEHICLES

CROSS-REFERENCE TO RELATED APPLICATIONS

This application is a continuation of U.S. application Ser. No. 16/253,599, filed Jan. 22, 2019, now U.S. Pat. No. 10,936,915, which is a continuation of U.S. application Ser. No. 15/948,286, filed Apr. 9, 2018, now U.S. Pat. No. 10,235,602, which is a continuation of U.S. application Ser. No. 15/915,947, filed Mar. 8, 2018, now U.S. Pat. No. 10,140,553. The contents of each of the above-referenced application are incorporated herein by reference in their entireties.

TECHNICAL FIELD

The present disclosure relates generally to a machine-learning artificial intelligence system for identifying images, and more particularly, to an artificial intelligence system that categorizes images of vehicles, identifies vehicle attributes, and displays associated information in a client device.

BACKGROUND

Identification of vehicles using computer-implemented image analysis is used in various applications. For example, license plate image recognition systems are frequently used in automated tollgates that identify moving vehicles to automatically collect tolls. In addition, systems that combine license plate recognition and detection of vehicle features, such as car color or make, are used to improve identification accuracy when the license plate cannot be adequately identified. Indeed, highly accurate vehicle identification based on only vehicle features is possible with techniques based on machine-learning algorithms such as convolutional neural networks. These algorithms capture features from images of known vehicles and then identify an unknown vehicle in an image by correlating image features. Although these techniques may be computer-intensive, they can improve identification accuracy and facilitate the automation of a vehicle image identification system.

Traditionally, image recognition of vehicles has focused on non-portable applications, such as monitoring the entrance of a parking lot or supervising highway entrances. However, identification of vehicles using mobile or handheld devices is highly desirable for portable applications. For example, when a person sees a vehicle in the street and wants to get information about it, this person would normally need to approach the vehicle to figure out details such as make or model. Alternatively, the person may need to browse multiple images and websites to try to find the vehicle characteristics. Portable identification of vehicles using image analysis would facilitate identification of vehicles without the burden of approaching the vehicle or perform later searches.

Moreover, identification of vehicles using handheld devices is also desirable to exploit the handheld device capabilities and develop new applications. For example, portable identification of vehicles may enable augmented reality applications that improve user experience. After a vehicle is automatically identified, it may be possible to generate and superimpose a computer-generated image on a user's view in a client device to seamlessly provide information about the vehicle. Also, portable detection of vehicles using handheld devices may enable advertising opportunities. For example, a customer may use the handheld device to identify vehicles that the user is interested to purchase. After identifying the vehicle, the user may receive information about the vehicle and location information about car dealers selling the vehicle. Thus, portable image recognition of vehicles enables new desirable applications.

However, identification of vehicles using image analysis in handheld devices has multiple technical challenges. First, the machine-learning methods that provide enough precision for image analysis are computer-intensive and may be difficult to perform in a handheld device. These methods normally require the analysis of a plethora of well-curated training images before an identification process may be performed. Constructing a group of images that can be used to train machine-learning algorithms is difficult and resource intensive. Second, portable image identification of images needs to be performed quickly to be user-friendly. Particularly for augmented reality applications, in which users are expecting an immediate response, it is imperative to have efficient computing identification methods and communication systems that facilitate image recognition. Third, images or video feeds taken with a mobile device may not be uniform and may have different qualities and/or formats. Because image analysis using machine-learning methods is heavily dependent on the quality of the target image, accurate identification of vehicles in images taken with mobile devices is difficult and sometimes unsuccessful. Fourth, handheld devices have limited display screen space. Applications that require both image acquisition and display of information in a single screen, such as augmented reality applications, require specific graphical user interfaces so the user can comfortably see and manipulate the information.

The disclosed machine-learning artificial intelligence system and identification methods address one or more of the problems set forth above and/or other problems in the prior art.

SUMMARY

One aspect of the present disclosure is directed a system for identifying attributes in an image. The system may include at least one processor in communication with a client device; and at least one storage medium storing instructions that, when executed, configure the processor to perform operations. The operations may include obtaining a plurality of first images, the first images being associated with first metadata; extracting a plurality of first features from the first images; categorizing the first images into one of a first group or a second group based on the first features; modifying the first metadata associated with images in the first images to include a binary label, the binary label representing into which of first and second groups the image was categorized; calculating a classification function that classifies the first images based on image features and the binary label; obtaining a plurality of second images, the second images being associated with second metadata; classifying the second images into one of the first group or the second group using the classification function; extracting a plurality of second features from the second images classified into the first group; categorizing the second images in the first group by attribute, based on the second features; calculating an attribute identification function that identifies attributes of the second images based on image features; receiving a client image from the client device; and identifying at least one attribute associated with the client image using the attribute identification function.

Another aspect of the present disclosure is directed a non-transitory computer-readable medium storing instructions that, when executed by a processor, cause the processor to operate a computer system for identifying attributes in an image by performing operations. The operations may include obtaining a plurality of first images, the first images being associated with first metadata; extracting a plurality of first features from the first images; categorizing the first images into one of a first group or a second group based on the first features; modifying the first metadata associated with images in the first images to include a binary label, the binary label representing into which of first and second groups the image was categorized; calculating a classification function that classifies the first images based on image features and the binary label; obtaining a plurality of second images, the second images being associated with second metadata; classifying the second images into one of the first group or the second group using the classification function; extracting a plurality of second features from the second images classified into the first group; categorizing the second images in the first group by attribute, based on the second features; calculating an attribute identification function that identifies attributes of the second images based on image features; receiving a client image from the client device; and identifying at least one attribute associated with the client image using the attribute identification function.

Yet another aspect of the present disclosure is directed to a computer-implemented method for identifying attributes in an image. The method may include obtaining a plurality of first images, the first images being associated with first metadata; extracting a plurality of first features from the first images: categorizing the first images into one of a first group or a second group based on the first features; modifying the first metadata associated with images in the first images to include a binary label, the binary label representing into which of first and second groups the image was categorized; calculating a classification function that classifies the first images based on image features and the binary label; obtaining a plurality of second images, the second images being associated with second metadata; classifying the second images into one of the first group or the second group using the classification function; extracting a plurality of second features from the second images classified into the first group; categorizing the second images in the first group by attribute, based on the second features; calculating an attribute identification function that identifies attributes of the second images based on image features; receiving a client image from the client device; and identifying at least one attribute associated with the client image using the attribute identification function.

Other aspect of the present disclosure is directed to a computer system for identifying attributes in an image of a vehicle. The system may include: at least one processor in communication with an online resource and a database; and at least one storage medium storing instructions that, when executed, configure the processor to execute operations. The operations may include: collecting images of vehicles from the online resource; classifying the collected images in a first group of or a second group using a classifier function, the first group including images of vehicle exteriors and the second group including images of vehicle interiors; modifying metadata associated with images in the first group to indicate that the images in the first group display vehicle exteriors; retrieving an original training data set of images and an original attribute identification function from the database; generating an updated training data set by adding the images in the first group to the original training data set; calculating an updated attribution identification function based on the updated training data set and the original attribute identification function; receiving a client image of a vehicle from a client device; and identifying attributes in the client image using the updated attribute identification function.

Another aspect of the present disclosure is directed to a non-transitory computer-readable medium storing instructions that, when executed by a processor, cause the processor to operate a system for identifying attributes in an image of a vehicle. The operation may include: collecting images of vehicles from an online resource; classifying the collected images in a first group of or a second group using a classifier function, the first group including images of vehicle exteriors and the second group including images of vehicle interiors; modifying metadata associated with images in the first group to indicate that the images in the first group display vehicle exteriors; retrieving an original training data set of images and an original attribute identification function from a database; generating an updated training data set by adding the images in the first group to the original training data set; calculating an updated attribution identification function based on the updated training data set and the original attribute identification function; receiving a client image of a vehicle from a client device; and identifying attributes in a client image using the updated attribute identification function.

Yet another aspect of the present disclosure is directed to a computer-implemented method for identifying attributes in an image of a vehicle. The method may include: collecting images of vehicles from the online resource; classifying the collected images in a first group of or a second group using a classifier function, the first group including images of vehicle exteriors and the second group including images of vehicle interiors; modifying metadata associated with images in the first group to indicate that the images in the first group display vehicle exteriors; retrieving an original training data set of images and an original attribute identification function from a database; generating an updated training data set by adding the images in the first group to the original training data set; calculating an updated attribution identification function based on the updated training data set and the original attribute identification function; receiving a client image of a vehicle from a client device; and identifying attributes in a client image of a vehicle using the updated attribute identification function.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

The disclosure is generally directed to a machine-learning artificial intelligence system for identifying vehicle attributes from a vehicle image and communicating vehicle information to a client device. In some embodiments, the vehicle information may be communicated by superimposing images on graphical user interfaces displayed on a handheld device. The artificial intelligence system improves the identification processing time and accuracy by generating a classification function and an attribute identification function using specific training data sets. In some embodiments, the attribute identification function may be a convolutional neural network (CNN). The classification function is determined based on a first group of images, which is categorized and labeled in at least two groups of images. The classification function is then used to classify and label a second group of images which is then used to generate the attribute identification function. The attribute identification function may identify variables from images such as vehicle make, vehicle model, vehicle year, and/or vehicle trim. This division of classification and attribute functions improves the identification system by facilitating management of computing resources. Moreover, the machine-learning artificial intelligence system may improve the accuracy of detection by generating a highly relevant training data set. To overcome the lack of uniformity from images received for identification, the training data sets used by the identification system may include images that are modified with to account for variations from images taken with mobile devices. Further, the identification system may be automatically updated as new images become available and vehicle information changes and use a web scraper to collect new images available in online resources. The identification system may re-calculate the classification and attribute identification functions as information in online resources changes. The artificial intelligence system additionally may generate graphical user interfaces (GUI) displaying identified information and may generate augmented reality GUIs. In some embodiments, the artificial intelligence system may comprise specialized software to efficiently conduct filtering, sorting, and parallel calculation tasks that improve computing time and enable real-time applications such as augmented reality.

Reference will now be made in detail to the disclosed embodiments, examples of which are illustrated in the accompanying drawings.

Figure 1:
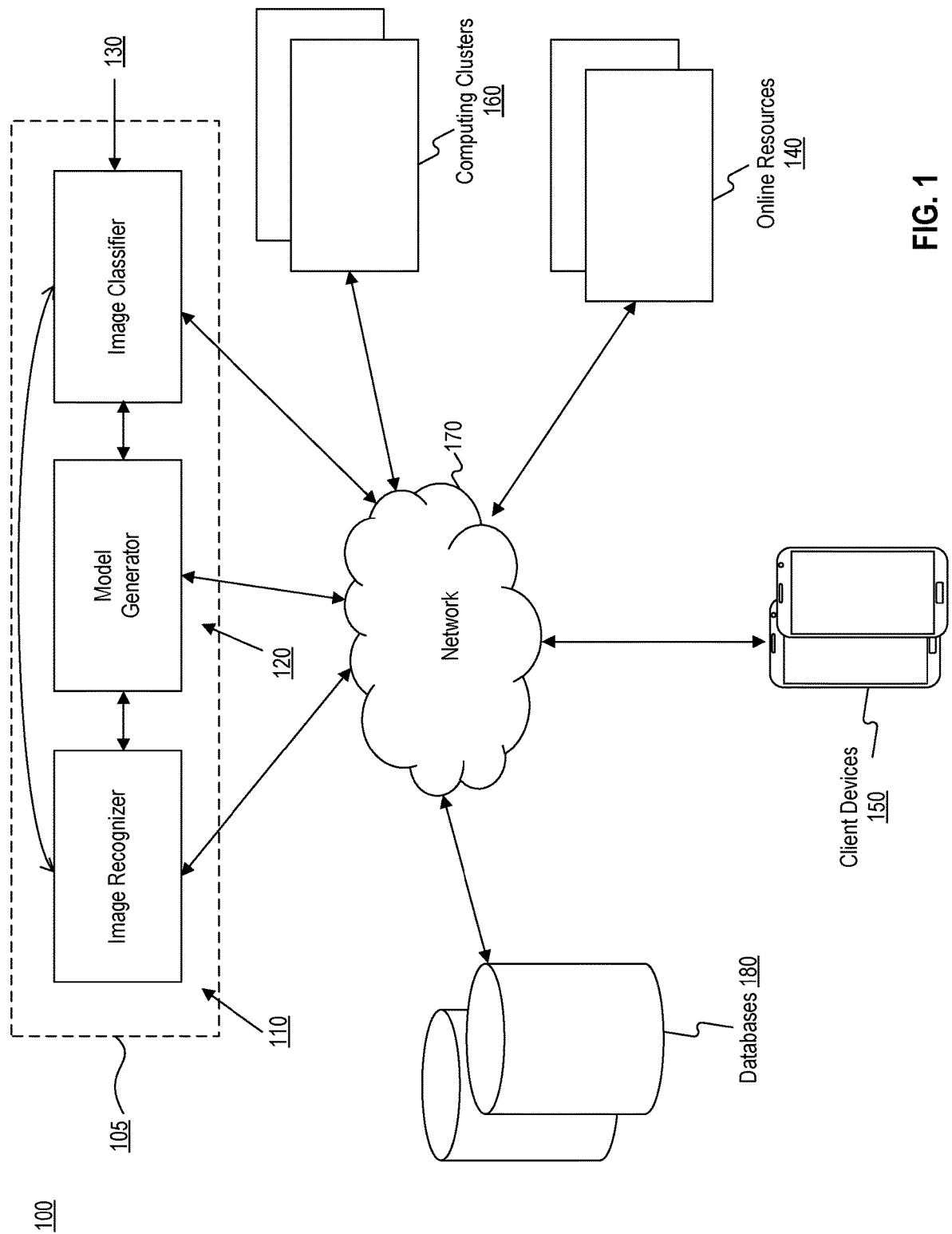
FIG. 1 is a block diagram of an exemplary system, consistent with disclosed embodiments.

FIG. 1 is a block diagram of an exemplary system 100, consistent with disclosed embodiments. System 100 may be used to identify a vehicle and associated attributes based on an image of the vehicle, consistent with disclosed embodiments. System 100 may include an identification system 105 which may include an image recognizer 110, a model generator 120, and an image classifier 130. System 100 may additionally include online resources 140, client devices 150, computing clusters 160, and databases 180. In some embodiments, as shown in FIG. 1, components of system 100 may be connected to a network 170. However, in other embodiments components of system 100 may be connected directly with each other, without network 170.

Online resources 140 may include one or more servers or storage services provided by an entity such as a provider of website hosting, networking, cloud, or backup services. In some embodiments, online resources 140 may be associated with hosting services or servers that store web pages for car manufacturers and/or car dealers. In other embodiments, online resources 140 may be associated with a cloud computing service such as Microsoft Azure™ or Amazon Web Services™. In yet other embodiments, online resources 140 may be associated with a messaging service, such as, for example, Apple Push Notification Service, Azure Mobile Services, or Google Cloud Messaging. In such embodiments, online resources 140 may handle the delivery of messages and notifications related to functions of the disclosed embodiments, such as image compression, notification of identified vehicles alerts, and/or completion messages and notifications.

Client devices 150 may include one or more computing devices configured to perform one or more operations consistent with disclosed embodiments. For example, client devices 150 may include a desktop computer, a laptop, a server, a mobile device (e.g., tablet, smart phone, etc.), a gaming device, a wearable computing device, or other type of computing device. Client devices 150 may include one or more processors configured to execute software instructions stored in memory, such as memory included in client devices 150, to perform operations to implement the functions described below. Client devices 150 may include software that when executed by a processor performs known Internet-related communication and content display processes. For instance, client devices 150 may execute browser software that generates and displays interfaces including content on a display device included in, or connected to, client devices 150. Client devices 150 may execute applications that allows client devices 150 to communicate with components over network 170, and generate and display content in interfaces via display devices included in client devices 150. The display devices may be configured to display images described in FIGS. 16-17. The disclosed embodiments are not limited to any particular configuration of client devices 150. For instance, a client device 150 may be a mobile device that stores and executes mobile applications to perform operations that provide functions offered by identification system 105 and/or online resources 140, such as providing information about vehicles in a database 180. In certain embodiments, client devices 150 may be configured to execute software instructions relating to location services, such as GPS locations. For example, client devices 150 may be configured to determine a geographic location and provide location data and time stamp data corresponding to the location data. In yet other embodiments, client devices 150 may have camera 620 to capture video and/or images.

Computing clusters 160 may include a plurality of computing devices in communication. For example, in some embodiments, computing clusters 160 may be a group of processors in communication through fast local area networks. In other embodiments computing clusters 160 may be an array of graphical processing units configured to work in parallel as a GPU cluster. In such embodiments, computer cluster may include heterogeneous or homogeneous hardware. In some embodiments, computing clusters 160 may include a GPU driver for the each type of GPU present in each cluster node, a Clustering API (such as the Message Passing Interface, MPI), and VirtualCL (VCL) cluster platform such as a wrapper for OpenCL™ that allows most unmodified applications to transparently utilize multiple OpenCL devices in a cluster. In yet other embodiments, computing clusters 160 may operate with distcc (a program to distribute builds of C, C++, Objective C or Objective C++ code across several machines on a network to speed up building), and MPICH (a standard for message-passing for distributed-memory applications used in parallel computing), Linux Virtual Server™, Linux-HA™, or other director-based clusters that allow incoming requests for services to be distributed across multiple cluster nodes.

Databases 180 may include one or more computing devices configured with appropriate software to perform operations consistent with providing identification system 105, model generator 120, and image classifier 130 with data associated with vehicle images, vehicle features, and stored information about vehicle sales like cost or condition. Databases 180 may include, for example, Oracle™ databases, Sybase™ databases, or other relational databases or non-relational databases, such as Hadoop™ sequence files, HBase™, or Cassandra™. Database(s) 180 may include computing components (e.g., database management system, database server, etc.) configured to receive and process requests for data stored in memory devices of the database (s) and to provide data from the database(s).

While databases 180 are shown separately, in some embodiments databases 180 may be included in or otherwise related to one or more of identification system 105, image recognizer 110, model generator 120, image classifier 130, and online resources 140.

Databases 180 may be configured to collect and/or maintain the data associated with vehicles being displayed in online resources 140 and provide it to the identification system 105, model generator 120, image classifier 130, and client devices 150. Databases 180 may collect the data from a variety of sources, including, for instance, online resources 140. Databases 180 are further described below in connection with FIG. 5.

Image classifier 130 may include one or more computing systems that collect images and process them to create training data sets that can be used to develop the identification model. For example, image classifier 130 may include an image collector 410 (FIG. 4) that collects images that are then used for training a linear regression classifier or a convolutional neural network. In some embodiments, image classifier 130 may be in communication with online resources 140 and detect changes in the online resources 140 to collect images and being the classification process.

Model generator 120 may include one or more computing systems configured to generate models to identify a vehicle using a vehicle image. Model generator 120 may receive or obtain information from databases 180, computing clusters 160, online resources 140, and image classifier 130. For example, model generator 120 may receive a plurality of images from databases 180 and online resources 140. Model generator 120 may also receive images and metadata from image classifier 130.

In some embodiments, model generator 120 may receive requests from image recognizer 110. As a response to the request, model generator 120 may generate one or more identification models. Identification models may include statistical algorithms that are used to determine the likeliness between images given a set of training images. For example, identification models may be convolutional neural networks that determine attributes in a figure based on extracted parameters. However, identification models may also include regression models that estimate the relationships among input and output variables. Identification models may additionally sort elements of a dataset using one or more classifiers to determine the probability of a specific outcome. Identification models may be parametric, non-parametric, and/or semi-parametric models.

In some embodiments, identification models may represent an input layer and an output layer connected via nodes with different activation functions as in a convolutional neural network. "Layers" in the neural network may transform an input variable into an output variable (e.g., holding the class scores) through a differentiable function. The convolutional neural network may include multiple distinct types of layers. For example, the network may include a convolution layer, a pooling layer, a ReLU Layer, a number filter layer, a filter shape layer, and/or a loss layer. Further, the convolution neural network may comprise a plurality of nodes. Each node may be associated with an activation function and each node maybe connected with other nodes via synapsis that are associated with a weight. The neural networks may model input/output relationships of variables and parameters by generating a number of interconnected nodes which contain an activation function. The activation function of a node may define a resulting output of that node given an argument or a set of arguments. Artificial neural networks may generate patterns to the network via an 'input layer', which communicates to one or more "hidden layers" where the system determines regressions via weighted connections. Identification models may also include Random Forests, composed of a combination of decision tree predictors. (Decision trees may comprise a data structure mapping observations about something, in the "branch" of the tree, to conclusions about that thing's target value, in the "leaves" of the tree.) Each tree may depend on the values of a random vector sampled independently and with the same distribution for all trees in the forest. Identification models may additionally or alternatively include classification and regression trees, or other types of models known to those skilled in the art. Model generator 120 may submit models to identify a vehicle. To generate identification models, model generator 120 may analyze images that are classified by the image classifier 130 applying machine-learning methods. Model generator 120 is further described below in connection with FIG. 3.

Image recognizer 110 may include one or more computing systems configured to perform operations consistent with identifying vehicle images. In some embodiments, Image recognizer 110 may receive a request to identify an image. Image recognizer 110 may receive the request directly from client devices 150. Alternatively, image recognizer 110 may receive the request from other components of system 100. For example, client devices 150 may send requests to online resources 140, which then sends requests to identification system 105. The request may include an image of a vehicle and a location of client devices 150. Additionally, in some embodiments the request may specify a date and preferences. In other embodiments, the request may include a video file or a streaming video feed.

As a response to identification requests, identification system 105 may initiate identification models using model generator 120. The request may include information about the image source, for example an identification of client device 150. The request may additionally specify a location. In addition, image recognizer 110 may retrieve information from databases 180. In other embodiments, identification system 105 may handle identification requests with image recognizer 110 and retrieve a previously developed model by model generator 120.

Image recognizer 110 may generate an identification result based on the information received from the client device request and transmit the information to the client device. Image recognizer 110 may generate instructions to modify a graphical user interface to include identification information associated with the received image. Image recognizer 110 is further described below in connection with FIG. 2.

FIG. 1 shows Image recognizer 110, model generator 120, and image classifier 130 as different components. However, Image recognizer 110, model generator 120, and image classifier 130 may be implemented in the same computing system. For example, all elements in identification system 105 may be embodied in a single server.

Network 170 may be any type of network configured to provide communications between components of system 100. For example, network 170 may be any type of network (including infrastructure) that provides communications, exchanges information, and/or facilitates the exchange of information, such as the Internet, a Local Area Network, near field communication (NFC), optical code scanner, or other suitable connection(s) that enables the sending and receiving of information between the components of system 100. In other embodiments, one or more components of system 100 may communicate directly through a dedicated communication link(s).

It is to be understood that the configuration and boundaries of the functional building blocks of system 100 have been defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 2:
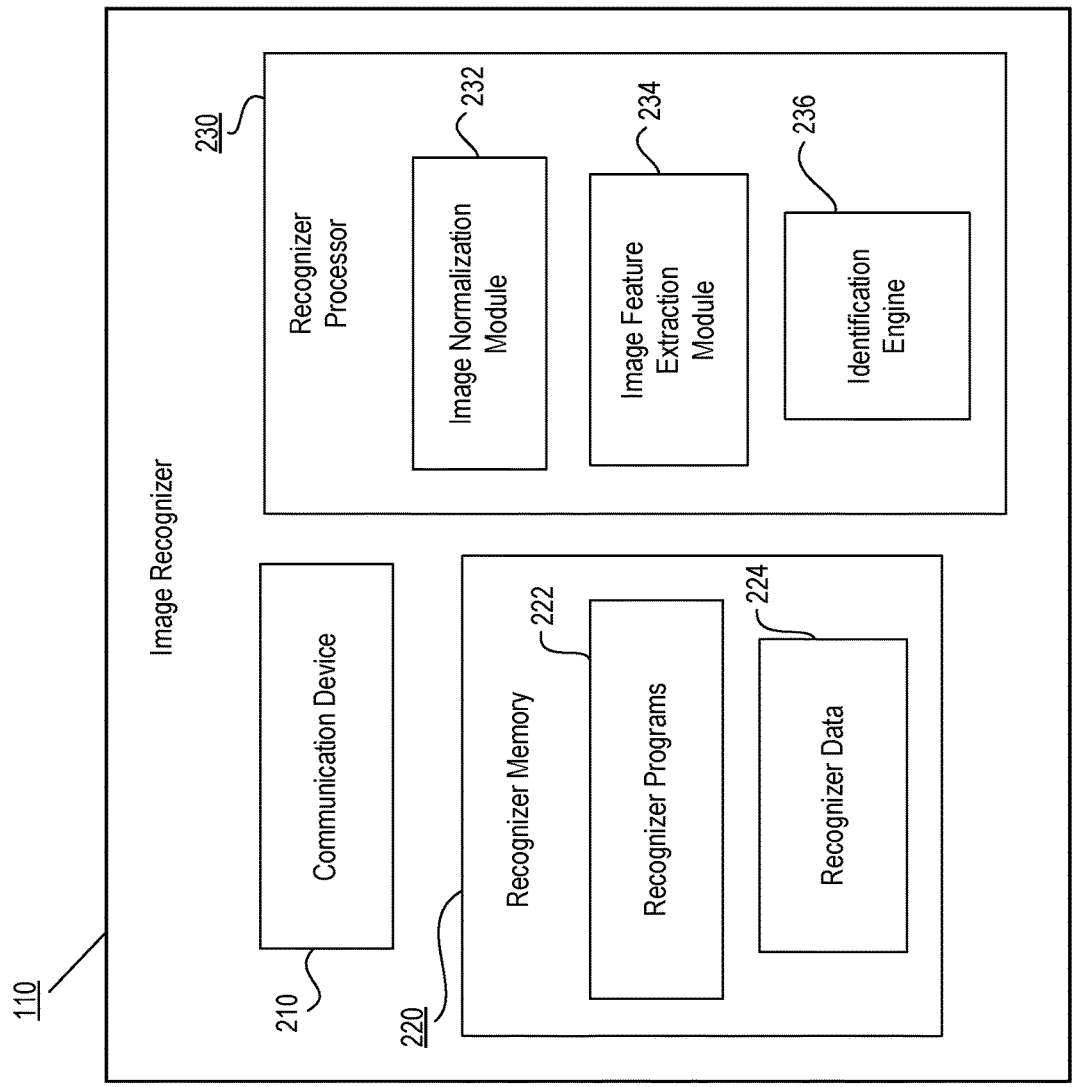
FIG. 2 is a block diagram of an exemplary image recognizer, consistent with disclosed embodiments.

FIG. 2 shows a block diagram of an exemplary image recognizer 110, consistent with disclosed embodiments. Image recognizer 110 may include a communication device 210, a recognizer memory 220, and one or more recognizer processors 230. Recognizer memory 220 may include recognizer programs 222 and recognizer data 224. Recognizer processor 230 may include an image normalization module 232, an image feature extraction module 234, and an identification engine 236.

In some embodiments, image recognizer 110 may take the form of a server, a general purpose computer, a mainframe computer, or any combination of these components. In other embodiments, image recognizer 110 may be a virtual machine. Other implementations consistent with disclosed embodiments are possible as well.

Communication device 210 may be configured to communicate with one or more databases, such as databases 180 described above, either directly, or via network 170. In particular, communication device 210 may be configured to receive from model generator 120 a model to identify vehicle attributes in an image and client images from client devices 150. In addition, communication device 210 may be configured to communicate with other components as well, including, for example, databases 180 and image classifier 130.

Communication device 210 may include, for example, one or more digital and/or analog devices that allow communication device 210 to communicate with and/or detect other components, such as a network controller and/or wireless adaptor for communicating over the Internet. Other implementations consistent with disclosed embodiments are possible as well.

Recognizer memory 220 may include one or more storage devices configured to store instructions used by recognizer processor 230 to perform functions related to disclosed embodiments. For example, recognizer memory 220 may store software instructions, such as recognizer program 222, that may perform operations when executed by recognizer processor 230. The disclosed embodiments are not limited to separate programs or computers configured to perform dedicated tasks. For example, recognizer memory 220 may include a single recognizer program 222 that performs the functions of image recognizer 110, or recognizer program 222 may comprise multiple programs. Recognizer memory 220 may also store recognizer data 224 that is used by recognizer program(s) 222.

Figure 16:
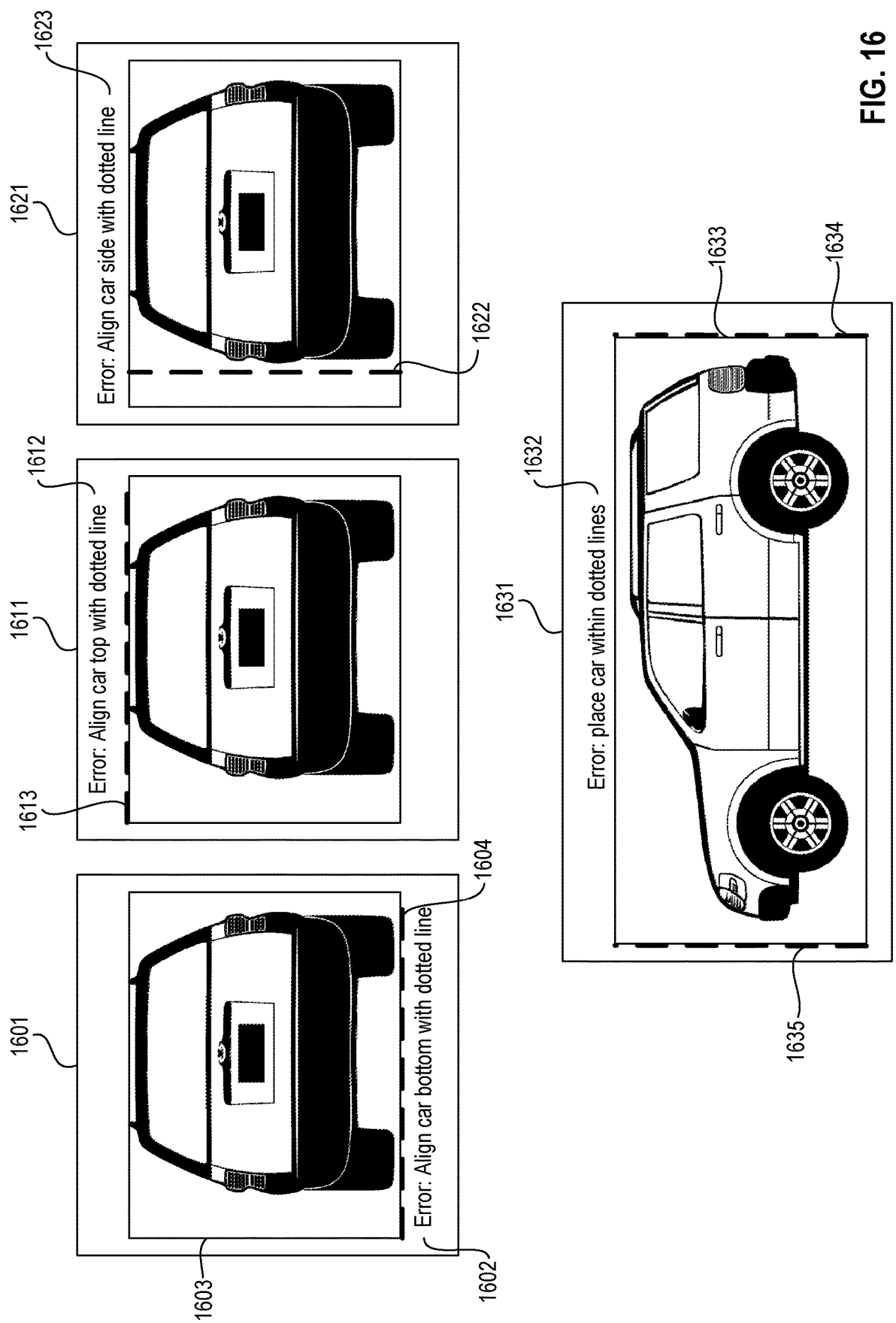
FIG. 16 is a group of exemplary graphical user interfaces capturing vehicle images, according with disclosed embodiments.

In certain embodiments, recognizer memory 220 may store sets of instructions for carrying out processes to identify a vehicle from an image, generate a list of identified attributes, and/or generate instructions to display a modified graphical user interface, described below in connection with FIGS. 16-17. In certain embodiments, recognizer memory 220 may store sets of instructions for identifying whether an image is acceptable for processing and generate instructions to guide the user in taking an acceptable image, such as the ones described below in connection with FIGS. 16-17. Other instructions are possible as well. In general, instructions may be executed by recognizer processor 230 to perform processes consistent with disclosed embodiments.

In some embodiments, recognizer processor 230 may include one or more known processing devices, such as, but not limited to, microprocessors from the Pentium™ or Xeon™ family manufactured by Intel™, the Turion™ family manufactured by AMD™, or any of various processors from other manufacturers. However, in other embodiments, recognizer processor 230 may be a plurality of devices coupled and configured to perform functions consistent with the disclosure.

In some embodiments, recognizer processor 230 may execute software to perform functions associated with each component of recognizer processor 230. In other embodiments, each component of recognizer processor 230 may be an independent device. In such embodiments, each component may be a hardware device configured to specifically process data or perform operations associated with modeling hours of operation, generating identification models and/or handling large data sets. For example, image normalization module 232 may be a field-programmable gate array (FPGA), image feature extraction module 234 may be a graphics processing unit (GPU), and identification engine 236 may be a central processing unit (CPU). Other hardware combinations are also possible. In yet other embodiments, combinations of hardware and software may be used to implement recognizer processor 230.

Image normalization module 232 may normalize a received image so it can be identified in the model. For example, communication device 210 may receive an image from client devices 150 to be identified. The image may be in a format that cannot be processed by image recognizer 110 because it is in an incompatible format or may have parameters that cannot be processed. For example, the received image may be received in a specific format such as High Efficiency Image File Format (HEIC) or in a vector image format such as Computer Graphic Metafile (CGM). Then, image normalization module 232 may convert the received image to a standard format such as JPEG or TIFF. Alternatively or additionally, the received image may have an aspect ratio that is incompatible with an identification model. For example, the image may have a 2.39:1 ratio which may be incompatible with the identification model. Then, image normalization module 232 may convert the received image to a standard aspect ratio such as 4:3. In some embodiments, the normalization may be guided by a model image. For example, a model image stored in recognizer data 224 may be used to guide the transformations of the received image. Additional processes that may be performed by image normalization module 232 are described in connection to FIG. 9.

In some embodiments, recognizer processor 230 may implement image normalization module 232 by executing instructions to create an application in which images are received and transformed. In other embodiments, however, image normalization module 232 may be a separate hardware device or group of devices configured to carry out image operations. For example, to improve performance and speed of the image transformations, image normalization module 232 may be an SRAM-based FPGA that functions as image normalization module 232. Image normalization module 232 may have an architecture designed for implementation of specific algorithms. For example, image normalization module 232 may include a Simple Risc Computer (SRC) architecture or other reconfigurable computing system.

Image feature extraction module 234 may extract features from a received image or a normalized image. In some embodiments, features may be extracted from an image by applying a pre-trained convolutional neural network. For example, in some embodiments pre-trained networks such as Inception-v3 or AlexNet may be used to automatically extract features from a target image. In such embodiments, feature extraction module 234 may import layers of a pre-trained convolutional network, determine features described in a target layer of the pre-trained convolutional network, and initialize a multiclass fitting model using the features in the target layer and images received for extraction.

In other embodiments other deep learning models such as Fast R-CNN can be used for automatic feature extraction. In yet other embodiments processes such as histogram of oriented gradients (HOG), speeded-up robust features (SURF), local binary patterns (LBP), color histogram, or Haar wavelets may also be used to extract features from a received image. In some embodiments, image feature extraction module 234 may partition the image in a plurality of channels and a plurality of portions, such that the channels determine a histogram of image intensities, determine feature vectors from intensity levels, and identify objects in a region of interest. Image feature extraction module 234 may perform other techniques to extract features from received images.

Recognizer processor 230 may implement image feature extraction module 234 by executing software to create an environment for extracting image features. However, in other embodiments image feature extraction module 234 may include independent hardware devices with specific architectures designed to improve the efficiency of aggregation or sorting processes. For example, image feature extraction module 234 may be a GPU array configured to partition and analyze layers in parallel. Alternatively or additionally, image feature extraction module 234 may be configured to implement a programming interface, such as Apache Spark™, and execute data structures, cluster managers, and/or distributed storage systems. For example, image feature extraction module 234 may include a resilient distributed dataset that is manipulated with a standalone software framework and/or a distributed file system.

Identification engine 236 may calculate correlations between a received image and stored attributes based on one or more identification models. For example, identification engine 236 may use a model from model generator 120 and apply inputs based on a received image or received image features to generate an attributes list associated with the received image.

Identification engine 236 may be implemented by recognizer processor 230. For example, recognizer processor 230 may execute software to create an environment to execute models from model generator 120. However, in other embodiments identification engine 236 may include hardware devices configured to carry out parallel operations. Some hardware configurations may improve the efficiency of calculations, particularly when multiple calculations are being processed in parallel. For example, identification engine 236 may include multicore processors or computer clusters to divide tasks and quickly perform calculations. In some embodiments, identification engine 236 may receive a plurality of models from model generator 120. In such embodiments, identification engine 236 may include a scheduling module. The scheduling module may receive models and assign each model to independent processors or cores. In other embodiments, identification engine 236 may be FPGA Arrays to provide greater performance and determinism.

The components of image recognizer 110 may be implemented in hardware, software, or a combination of both, as will be apparent to those skilled in the art. For example, although one or more components of image recognizer 110 may be implemented as computer processing instructions embodied in computer software, all or a portion of the functionality of image recognizer 110 may be implemented in dedicated hardware. For instance, groups of GPUs and/or FPGAs maybe used to quickly analyze data in recognizer processor 230.

Figure 3:
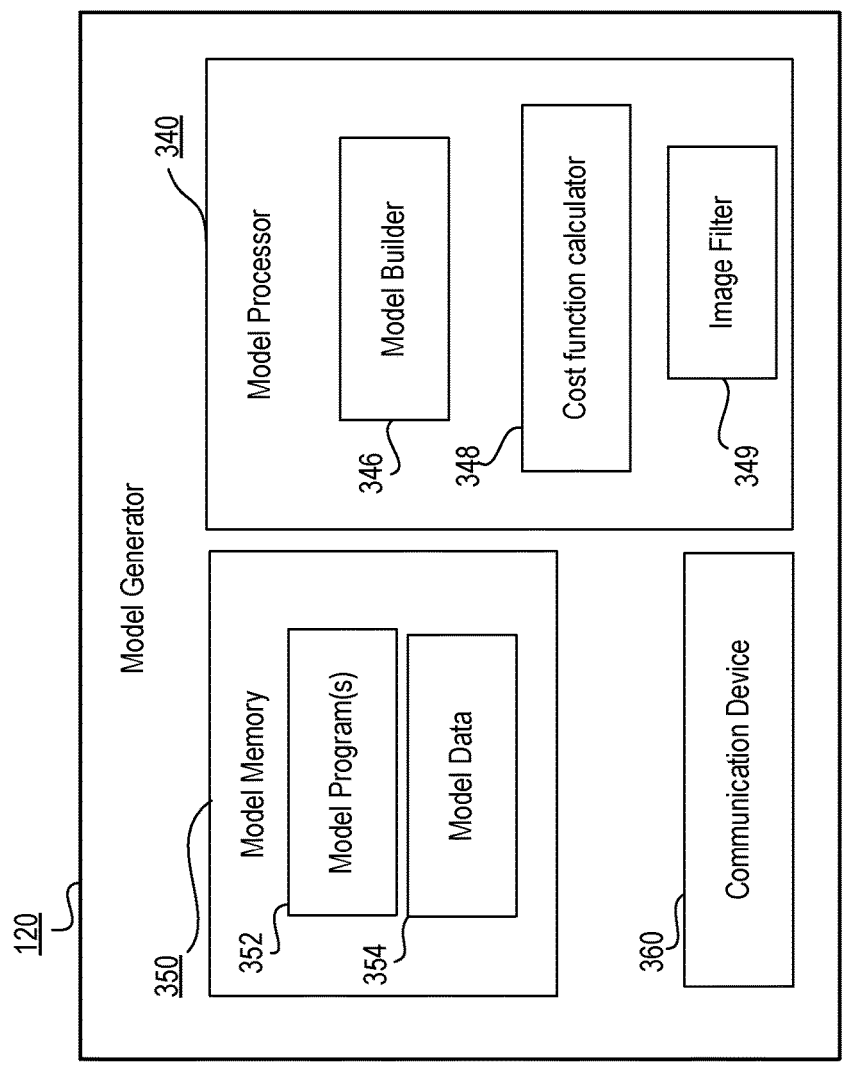
FIG. 3 is a block diagram of an exemplary model generator, consistent with disclosed embodiments.

Referring now to FIG. 3, there is shown a block diagram of an exemplary model generator, consistent with disclosed embodiments. Model generator 120 may include a model processor 340, a model memory 350, and a communication device 360.

Model processor 340 may be embodied as a processor similar to recognizer processor 230. Model processor may include an a model builder 346, a cost function calculator 348, and an image filter 349.

Model builder 346 may be implemented in software or hardware configured to create identification models based on training data. In some embodiments, model builder 346 may generate convolutional neural networks. For example, model builder 346 may take a group of labeled images from image classifier 130 to train a convolutional neural network. In some embodiments, model builder 346 may generate nodes, synapsis between nodes, pooling layers, and activation functions, to create a vehicle identification model. Model builder 346 may calculate coefficients and hyper parameters of the convolutional neural networks based on the training data set. In such embodiments, model builder 346 may select and/or develop convolutional neural networks in a backpropagation with gradient descent. However, in other embodiments, model builder 346 may use Bayesian algorithms or clustering algorithms to generate identification models. In this context, a "cluster" is a computation operation of grouping a set of objects in such a way that objects in the same group (called a cluster) are more similar to each other than to those in other groups or clusters. In yet other embodiments, model builder 346 may use association rule mining, random forest analysis, and/or deep learning algorithms to develop models. In some embodiments, to improve the efficiency of the model generation, model builder 346 may be implemented in one or more hardware devices, such as FPGAs, configured to generate models for vehicle image identification.

Cost function calculator 348 may be implemented in software or hardware configured to evaluate the accuracy of a model. For example, cost function estimator may estimate the accuracy of a model, generated by model builder 346, by using a validation dataset. In some embodiments, the validation data set may be a portion of a training data set, that was not used to generate the identification model. Cost function calculator 348 may generate error rates for the identification models, and may additionally assign weight coefficients to models based on the estimated accuracy.

Image filter 349 may be implemented in software or hardware configured to generate additional images to enhance the training data set used by model builder 346. One challenge in implementing portable identification systems using convolutional neural networks is the lack of uniformity in the images received from mobile devices. To enhance accuracy and prevent sending error messages requesting the user to take and send new images, image filter 349 may generate additional images based on images already classified and labeled by image classifier 130. For example, image filter 349 may take an image and apply rotation, flipping, or shear filters to generate new images that can be used to train the convolutional neural network. These additional images may improve the accuracy of the identification model, particularly in augmented reality applications, in which the images may be tilted or flipped as the user of client devices 150 takes images. In other embodiments, additional images may be based on modifying brightness or contrast of the image. In yet other embodiments, additional images may be based on modifying saturation or color hues.

Model memory 350 may include one or more storage devices configured to store instructions used by model processor 340 to perform operations related to disclosed embodiments. For example, model memory 350 may store software instructions, such as model program 352, that may perform operations when executed by model processor 340.

In addition model memory 350 may include model data 354, which may include images to train a convolutional neural network.

In certain embodiments, Model memory 350 may store sets of instructions for carrying out processes to generate a model that identifies attributes of a vehicle, described below in connection with FIG. 12.

Figure 4:
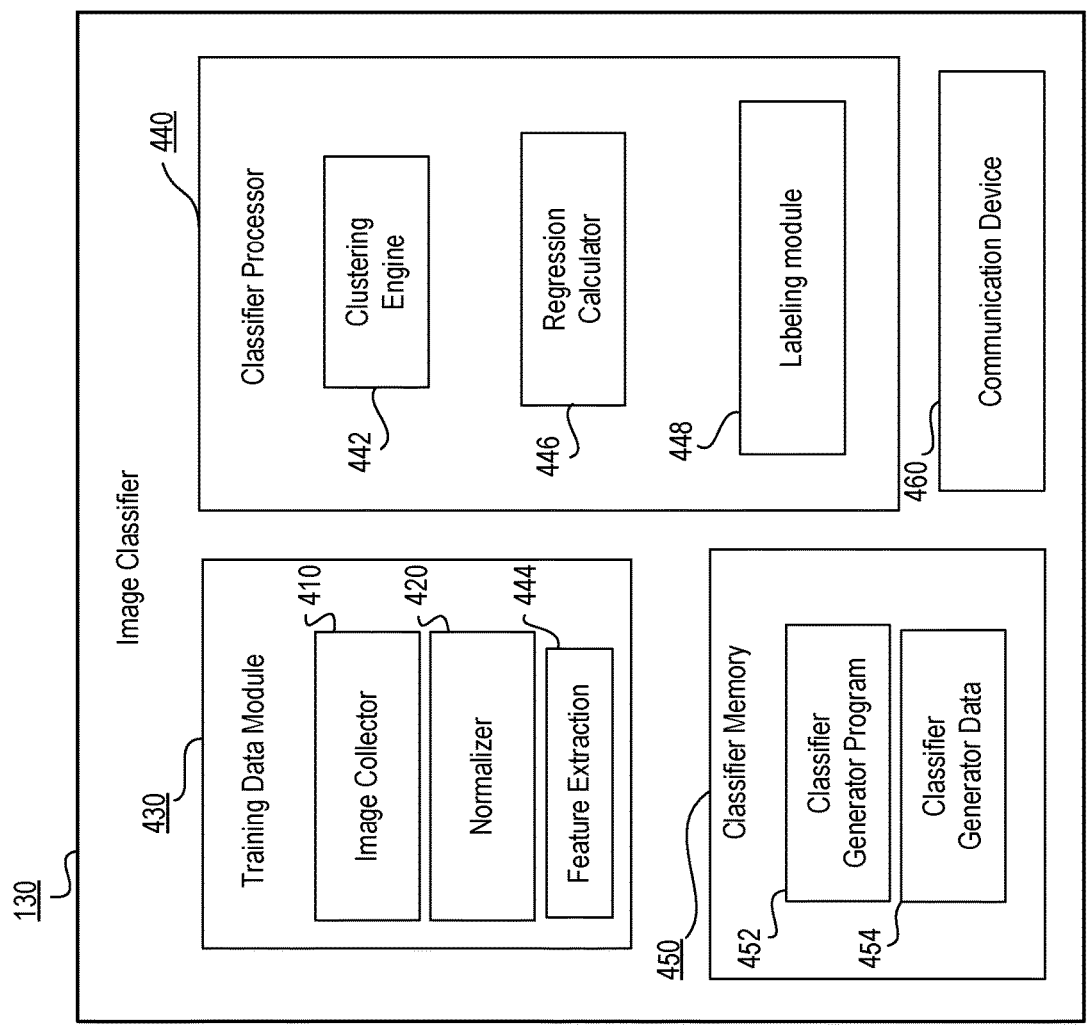
FIG. 4 is a block diagram of an exemplary image classifier, consistent with disclosed embodiments.

Referring now to FIG. 4, there is shown a block diagram of an exemplary image classifier, consistent with disclosed embodiments. Image classifier 130 may include a training data module 430, a classifier processor 440, and a classifier memory 450. In some embodiments, image classifier 130 may be configured to generate a group of images to be used as a training data set by model generator 120.

An issue that may prevent accurate image identification using machine learning algorithms is the lack of normalized and classified images that can be used as a training data set. While billions of images are available online, selection of a group of images to develop an identification model is difficult. For example, because a very large quantity of images is required to generate accurate models, it is expensive and challenging to generate training data sets with standard computing methods. Also, although it is possible to input poorly classified images and let the machine learning algorithm identify outliers, this process may delay the development of the model and undermine its accuracy. Moreover, even when images may be identified, lack of information in the associated metadata may prevent the creation of validation data sets to test the accuracy of the identification model.

For example, it is necessary to collect multiple images of vehicles with a known make, year, and/or model to train the model to identify a vehicle in an image and recognize the vehicle's make, year, and/or model. While search engines can be used to identify images associated with vehicles, for example a general search for "Mercedes AND X63 AND 2018" would return many vehicle images, the search results may include multiple images that are irrelevant and which may undermine the identification model. For example, the resulting images may include images of the interior of a vehicle, which are irrelevant for a vehicle identification application. Moreover, such general searches may also include promotional images that are not associated with the vehicle. Therefore, it becomes necessary to select a group of the resulting images, before the model is trained, to improve accuracy and time to identification. Indeed, for portable and augmented reality application, in which time is crucial, curating the training data set to improve the identification efficiency improves the user experience.

Image classifier 130 may be configured to address these issues and facilitate the generation of groups of images for training convolutional networks. Image classifier 130 may include a data module 430 which includes an image collector 410, an image normalizer module 420, and a feature extraction module 444.

Image collector 410 may be configured to search for images associated with key words. In some embodiments, image collector 410 may collect images from online resources 140 and store them in classifier memory 450. In some embodiments, classifier memory 450 may include at least one million images of vehicles to provide sufficient accuracy for clustering engine 442 and/or a logistic regression classifier. For example, image collector 410 may be in communication with servers and/or websites of car dealers and copy images therefrom into memory 450 for processing. Additionally, in some embodiments image collector 410 may be configured to detect changes in websites of car dealers and, using a web scraper, collect images upon detection of such changes.

In some embodiments, image collector 410 may search for metadata of interest in the collected images and classify images based on the metadata. In some embodiments image collector 410 may perform a preliminary keyword search in the images metadata. For example, image collector 410 may search for the word "car" in image metadata and discard images whose metadata does not include the word "car." In such embodiments, image collector 410 may additionally search metadata for additional words or associated features to assist in classifying the collected images. For instance, image collector may look for word "interior" or "exterior" in the image metadata. Alternatively, image collector 410 may identify images based on XMP data. In some embodiments, image collector 410 may classify images as "featureless" if the metadata associated with the images does not provide enough information to classify the image. These operations that may be performed by image collector 410 are further described in connection to FIG. 8.

Training data module 430 may additionally include an image normalization module 420, similar to the image normalization module 232. However, in some embodiments, image normalization module 420 may have a different model image resulting in a different normalized image. For example, the model image in image normalization module 420 may have a different format or different size.

Training data module 430 may have a feature extraction module 444 configured to extract features of images. In some embodiments, feature extraction module 444 may be similar to the image feature extraction module 234. For example, image feature extraction module 234 may also be configured to extract features from using a convolutional neural network.

In other embodiments, images that are collected by image collector 410 and normalized by image normalization module 420 may be processed by feature extraction module 444. For example, feature extraction module 444 may use max pooling layers, and mean, max, and L2 norm layers to computer data about the images it receives. The feature extraction module 444 may additionally generate a file with the features it identified from the image.

In yet other embodiments, feature extraction module 444 may implement feature extraction techniques as compiled functions that feed-forward data into an architecture to the layer of interest in the neural network. For instance, feature extraction module 444 may implement the following script:
dense_layer=layers.get_output(net1.layers_['dense'], deterministic=True)
output_layer=layers.get_output(net1.layers_['output'], deterministic=True)
input_var=net1.layers_['input'].input_var
f_output=t.function([input_var], output_layer)
f_dense=t.function([input_var], dense_layer)

The above functions may generate activations for a dense layer, layers before output layers. In some embodiments, feature extraction module 444 may use this activation to determine image parameters.

In other embodiments, feature extraction module 444 may implement engineered feature extraction methods such as scale-invariant feature transform, Vector of Locally Aggregated Descriptors (VLAD) encoding, or extractHOGFeatures, among others. Alternatively or additionally, feature extraction module 444 may use discriminative features based in the given context (i.e. Sparse Coding, Auto Encoders, Restricted Boltzmann Machines, PCA, ICA, K-means).

Image classifier 130 may include a classifier processor 440 which may include clustering engine 442, regression calculator 446, and labeling module 448. In some embodiments, classifier processor 440 may cluster images based on the extracted features using classifier processor 440 and particularly clustering engine 442.

Clustering engine 442 may be a processor configured to execute the steps to be described later in connection with FIG. 10. In some embodiments, clustering engine 442 may perform a density-based spatial clustering of applications with noise (DBSCAN). In such embodiments, clustering engine 442 may find a distance between coordinates associated with the images to establish core points, find the connected components of core points on a neighbor graph, and assign each non-core point to a nearby cluster. In some embodiments, clustering engine 442 may be configured to only create two clusters in a binary generation process. Alternatively or additionally, the clustering engine 442 may eliminate images that are not clustered in one of the two clusters as outliers. In other embodiments, clustering engine 442 may use linear clustering techniques, such as quality threshold clustering or logistic regressions, to cluster the coordinates associated with images. In yet other embodiments, clustering engine 442 may implement non-linear clustering algorithms such as MST-based clustering.

In some embodiments, clustering engine 442 may transmit information to labeling module 448. Labeling module 448 may be configured to add or modify metadata associated with images clustered by clustering engine 442. For example, labeling module 448 may add comments to the metadata specifying a binary classification. In some embodiments, where clustering engine 442 clusters vehicles exteriors and car interiors, the labeling module 448 may add a label of "exterior" or "interior" to the images in each cluster.

In some embodiments, a regression calculator 446 may generate a logistic regression classifier based on the images that have been labeled by labeling module 448. In some embodiments, regression calculator 446 may develop a sigmoid or logistic function that classifies images as "car interior" or "car exterior" based on the sample of labeled images. In such embodiments, regression calculator 446 may analyze the labeled images to determine one or more independent variables. Regression calculator 446 may then calculate an outcome, measured with a dichotomous variable (in which there are only two possible outcomes). Regression calculator 446 may then determine a classifier function that, given a set of image features, may classify the image into one of two groups. For instance, regression calculator 446 may generate a function that receives an image of a vehicle and determines if the image is of a car interior or exterior.

Classifier memory 450 may include one or more storage devices configured to store instructions used by classifier processor 440 to perform functions related to disclosed embodiments. For example, classifier memory 450 may store software instructions, such as classifier program 452, that may perform one or more operations when executed by classifier processor 440. In addition classifier memory 450 may include model data 354, which may include images for the regression calculator 446.

In certain embodiments, model memory 350 may store sets of instructions for carrying out processes to generate a model that identifies attributes of a vehicle based on images from image classifier 130. For example, identification system 105 may execute processes stored in model memory 350 using information from image classifier 130 and/or data from training data module 430. Exemplary processes to generate a model are described below in connection with FIG. 12.

Figure 5:
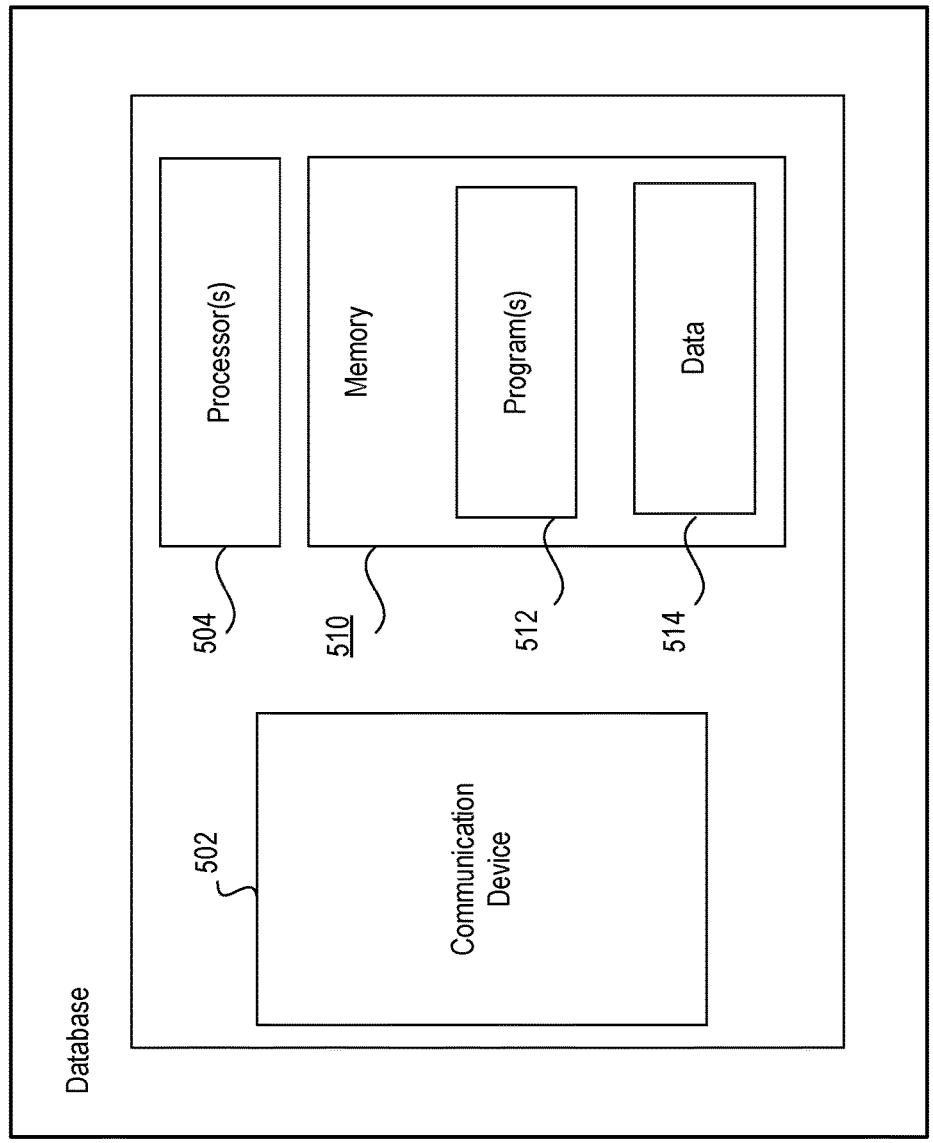
FIG. 5 is a block diagram of an exemplary database, consistent with disclosed embodiments.

Referring now to FIG. 5, there is shown a block diagram of an exemplary database 180 (FIG. 1), consistent with disclosed embodiments. Database 180 may include a communication device 502, one or more database processors 504, and database memory 510 including one or more database programs 512 and data 514.

In some embodiments, databases 180 may take the form of servers, general purpose computers, mainframe computers, or any combination of these components. Other implementations consistent with disclosed embodiments are possible as well.

Communication device 502 may be configured to communicate with one or more components of system 100, such as online resource 140, identification system 105, model generator 120, image classifier 130, and/or client devices 150. In particular, communication device 502 may be configured to provide to model generator 120 and image classifier 130 images of vehicles that may be used to generate a CNN or an identification model.

Communication device 502 may be configured to communicate with other components as well, including, for example, model memory 352 (FIG. 3). Communication device 502 may take any of the forms described above for communication device 210 (FIG. 2).

Database processors 504, database memory 510, database programs 512, and data 514 may take any of the forms described above for recognizer processors 230, memory 220, recognizer programs 222, and recognizer data 224, respectively, in connection with FIG. 2. The components of databases 180 may be implemented in hardware, software, or a combination of both hardware and software, as will be apparent to those skilled in the art. For example, although one or more components of databases 180 may be implemented as computer processing instruction modules, all or a portion of the functionality of databases 180 may be implemented instead in dedicated electronics hardware.

Data 514 may be data associated with websites, such as online resources 140. Data 514 may include, for example, information relating to websites of car dealers and/or car manufacturers. Data 514 may include images of cars and information relating to cars, such as cost, condition, and dealers offering the car for sale.

Figure 6:
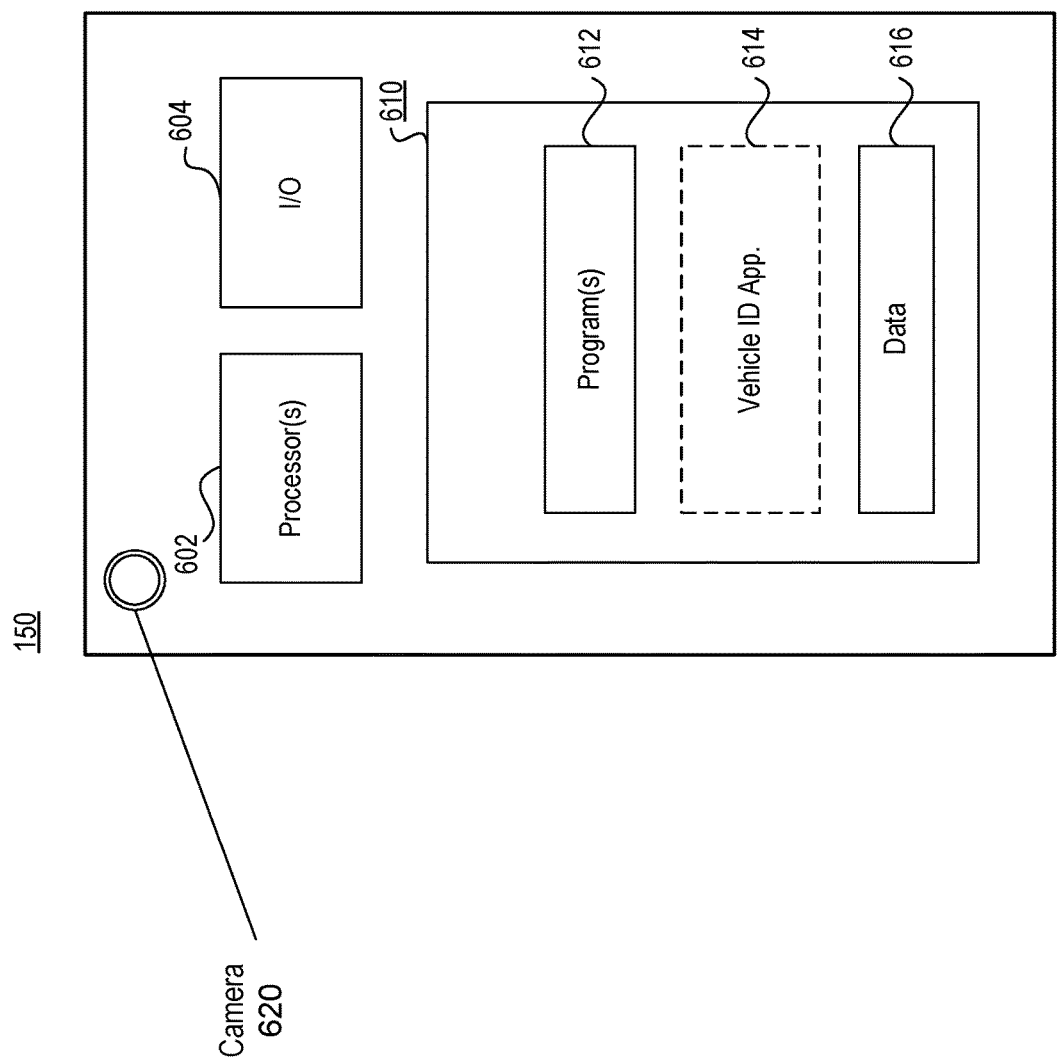
FIG. 6 is a block diagram of an exemplary client device, consistent with disclosed embodiments.

Referring now to FIG. 6, there is shown a block diagram of an exemplary client device 150 (FIG. 1), consistent with disclosed embodiments. In one embodiment, client devices 150 may include one or more processors 602, one or more input/output (I/O) devices 604, and one or more memories 610. In some embodiments, client devices 150 may take the form of mobile computing devices such as smartphones or tablets, general purpose computers, or any combination of these components. Alternatively, client devices 150 (or systems including client devices 150) may be configured as a particular apparatus, embedded system, dedicated circuit, and the like based on the storage, execution, and/or implementation of the software instructions that perform one or more operations consistent with the disclosed embodiments. According to some embodiments, client devices 150 may comprise web browsers or similar computing devices that access web site consistent with disclosed embodiments.

Processor 602 may include one or more known processing devices, such as mobile device microprocessors manufactured by Intel™, NVIDIA™, or various processors from other manufacturers. The disclosed embodiments are not limited to any specific type of processor configured in client devices 150.

Memory 610 may include one or more storage devices configured to store instructions used by processor 602 to perform functions related to disclosed embodiments. For example, memory 610 may be configured with one or more software instructions, such as programs 612 that may perform operations when executed by processor 602. The disclosed embodiments are not limited to separate programs or computers configured to perform dedicated tasks. For example, memory 610 may include a single program 612 that performs the functions of the client devices 150, or program 612 may comprise multiple programs. Memory 610 may also store data 616 that is used by one or more programs 312 (FIG. 3).

In certain embodiments, memory 610 may store a vehicle identification application 614 that may be executed by processor(s) 602 to perform one or more identification processes consistent with disclosed embodiments. In certain aspects, vehicle identification application 614, or another software component, may be configured to request identification from identification system 105 or determine the location of client devices 150. For instance, these software instructions, when executed by processor(s) 602 may process information to generate a request for hours of operation.

I/O devices 604 may include one or more devices configured to allow data to be received and/or transmitted by client devices 150 and to allow client devices 150 to communicate with other machines and devices, such as other components of system 100. For example, I/O devices 604 may include a screen for displaying optical payment methods such as Quick Response Codes (QR), or providing information to the user. I/O devices 604 may also include components for NFC communication. I/O devices 504 may also include one or more digital and/or analog devices that allow a user to interact with client devices 150 such as a touch-sensitive area, buttons, or microphones. I/O devices 604 may also include one or more accelerometers to detect the orientation and inertia of client devices 150. I/O devices 604 may also include other components known in the art for interacting with identification system 105.

In some embodiments, client devices 150 may include a camera 620 that is configured to take images or video and send it to other component of system 100 via, for example, network 170.

The components of client devices 150 may be implemented in hardware, software, or a combination of both hardware and software, as will be apparent to those skilled in the art.

Figure 7:
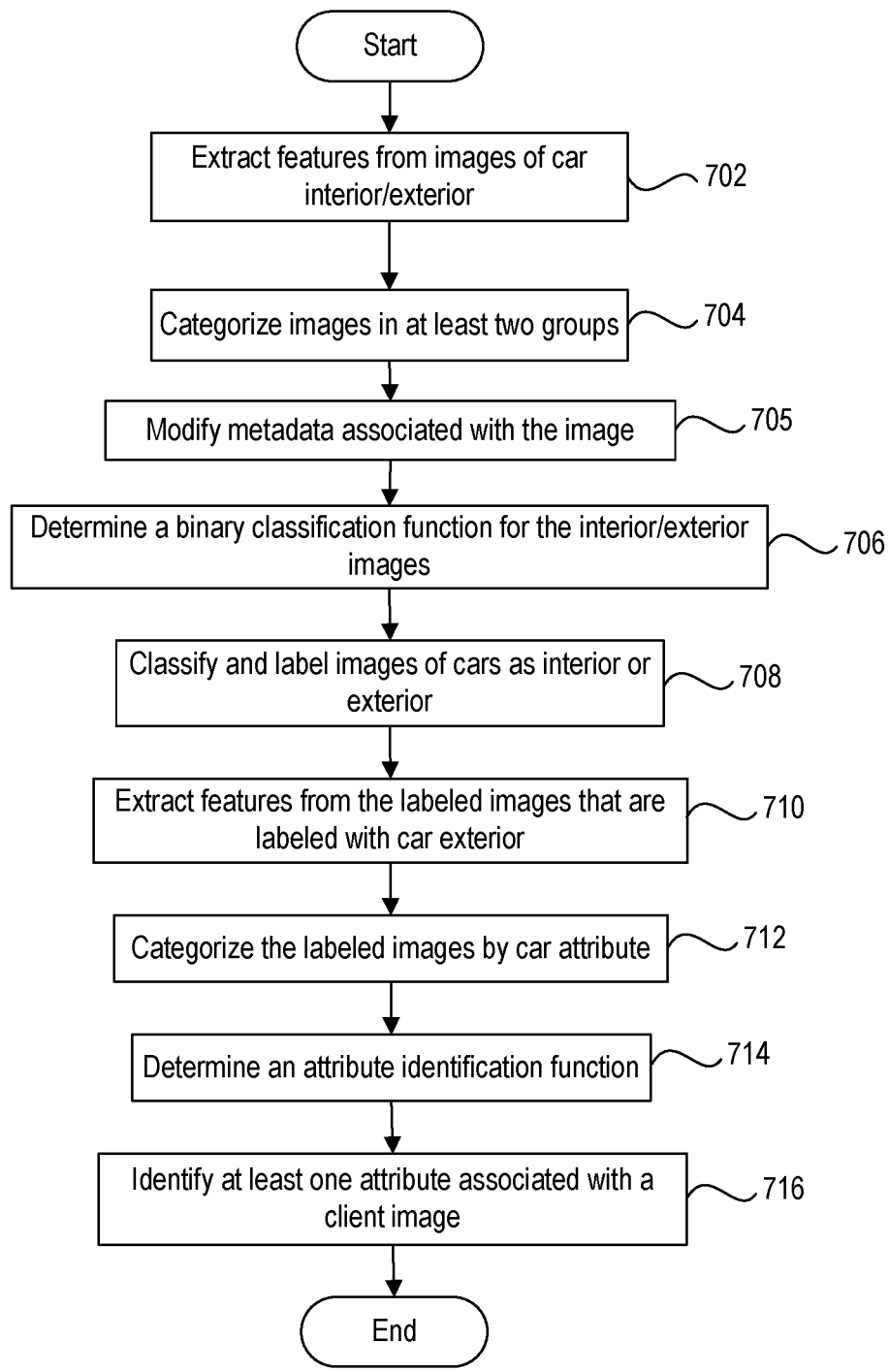
FIG. 7 is an exemplary flow chart illustrating an identification process, consistent with disclosed embodiments.

Referring now to FIG. 7, there is shown a flow chart of an exemplary identification process 700, consistent with disclosed embodiments. In some embodiments, identification process 700 may be executed by identification system 105.

In step 702, identification system 105 (FIG. 1) may receive a plurality of images to generate an attribute identification function. These images may be collected by image collector 410 (FIG. 4) by being scraped from, for example, websites of car dealers or car manufacturers. The collected images may be associated with metadata describing the type of image and whether the image is exterior or interior. In step 704, identification system 105 may categorize images in at least two groups. For example, identification system 105 may extract features from images and cluster them in binary groups. For example, clustering engine 442 may implement clustering techniques such as DBSCAN to classify images. In some embodiments, the classification may cluster images of car interiors and images of car exteriors in two different clusters. In some embodiments, identification system 105 may eliminate images that cannot be classified in step 704.

In step 705, identification system 105 may modify metadata associated with images based on their classification in step 704. For example, labeling module 448 (FIG. 4) may add comments like "exterior" or "interior" to the metadata associated with images. In some embodiments, labeling module 448 may implement a convention that later facilitates the sorting of labeled images. For instance, instead of adding notes to the metadata such as "interior" and "exterior," labeling image may change the file name of the images with a convention such as by including in the file name "1" for interior and "0" for exterior.

In step 706, identification system 105 may determine a classification function for the clustered images. For example, regression calculator 446 (FIG. 4) may create a logistic regression classifier based on image features and the labels created in step 705. In some embodiments, the classification may be binary and the linear regression may categorize images in one of two groups. For example, the classification function may classify images of cars between vehicle interior and vehicle exterior.

In step 708, identification system 105 may receive a second group of images and classify them using the classification function determined in step 706. For example, a logistic regression classifier determined in step 706 may be used to classify the second group of images. In some embodiments, the second group of images may be associated with metadata. For example, the metadata of the second group of images may include information about car make, model, year, and/or trim. In some embodiments, identification system 105 may classify the second group of images in images of car interior or car exterior based on the classification function. In such embodiments, identification system 105 may eliminate the images classified as car interior and use images classified as car exterior for training a machine learning algorithm. By removing car exterior images before generating a model, identification system 105 minimizes the resources devoted for image preprocessing and improves the speed to generate a model.

In step 710, identification system 105 may extract features from labeled images. For example, feature extraction module 444 may apply a pre-trained convolution network to extract features from images labeled with car "exterior."

In step 712, identification system 105 may categorize the labeled images based on attributes. For example, model builder 346 (FIG. 3) may associate image features extracted by a convolutional network with car brands or models. In other embodiments, model builder 346 may identify car logos and associate them with car make. In addition, model builder 346 may identify features such as shape of head lights with car models. In some embodiments, identification system 105 may categorize the labeled images using machine-learning algorithms such as convolutional neural networks using the labeled images as input. The categories in which the labeled images are categorized may include car makes and car models. Alternatively or additionally, the categories may include car year and car trim level. Further, in step 712 identification system 105 may generate a new file with categorized images. For example, identification system 105 may generate a matrix file with information identifying the categories in for example, binary tables.

In step 714, based on the categorized images, identification system 105 may generate an attribute function that identifies attributes of an image. For example, identification system 105 may generate an attribute identification function that receives as input an image of a vehicle and identifies attributes associated with the vehicle in the image. In some embodiments, the attribute function may be configured to receive an image of a car exterior and provide output attributes such as car make and car model. In some embodiments, the attribute identification function may additionally be configured to identify car trim level and/or car year. In some embodiments, in step 714 identification system 105 may create layers in a convolutional neural network to determine the attributes. For example, in step 714 identification system 105 may modify output layers of a pre-trained convolutional neural network to include layers that predict the target features of make, model, trim level, and year. In such embodiments, identification system 105 may generate a multi-output convolutional neural network configured to identify car attributes from car images. Alternatively or additionally, identification system 105 may modify weights in step 714 of hidden layers of a pre-trained convolutional neural network before an output layer is determined.

In some embodiments, in step 714 identification system 105 may determine the attribute identifications function by partitioning images into, for example, training images and validation images; generating an input file comprising features from images in the training images and a result file comprising the second metadata associated with the training images; and determining hyper parameters and activation functions. Moreover, in step 714 identification system 105 may calculate a plurality of weights based on the input file and the result file, where the weights may associate a plurality of nodes determined by the hyper parameters; and recursively calculate the attribute identification function until a cost function is below a threshold error.

In step 716, identification system 105 may use the attribute function determined in step 714 to identify at least one attribute associated with a client image. In some embodiments, identification system 105 may receive an image or a video feed from client devices 150. In such embodiments, identification system may identify attributes from the images using the attribute identification function. For example, identification system 105 may receive from a client devices 150 an image of a car or a video feed showing a car. Identification system 100 may then extract features from the image using, for example, image feature extraction module 234, and input the features to the attribute identification function. The attribute identification function may then return attributes of the car in the image such as the car's make and model.

In some embodiments, once attributes of the image are identified in step 716, identification system 105 may search for and display additional information. For example, using the identified information identification system 105 may search in databases 180 for a price for the identified vehicle given the identified attributes. In other embodiments, however, identification system 105 may search for cost and condition information in online resources 140. For example, identification system 105 may send an information query to websites such as Kelly Blue Book® to collect cost and condition information. In yet other embodiments, identification system 105 may send queries to dealer or car manufacturer websites to collect additional information of the vehicle. Identification system 105 may then modify the client image to overlay information of cost and condition.

Figure 8:
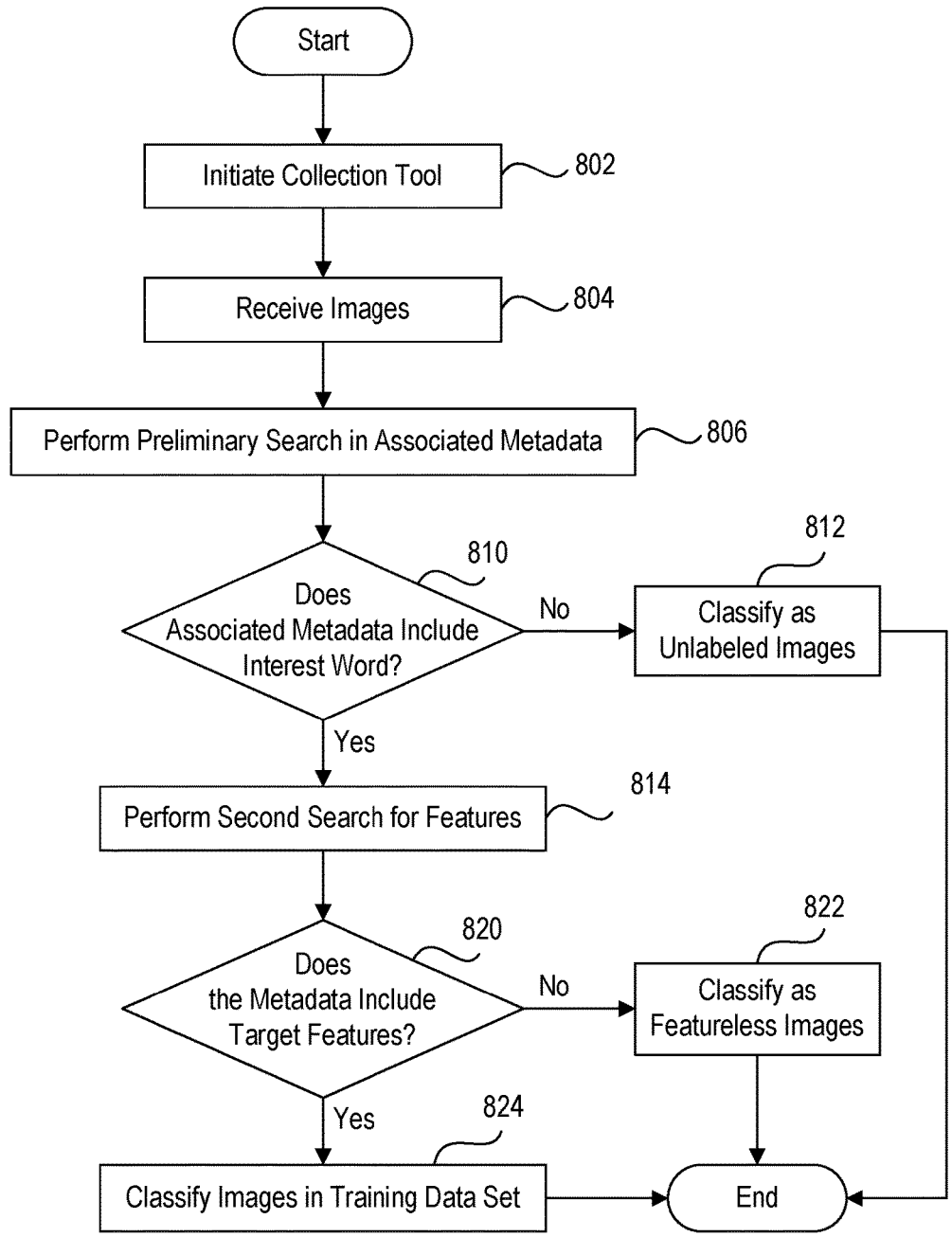
FIG. 8 is an exemplary flow chart illustrating a training data set generation process, consistent with disclosed embodiments.

Referring now to FIG. 8, there is shown a flow chart illustrating an exemplary training data set generation process 800, consistent with disclosed embodiments. In some embodiments generation process 800 may be carried out by identification system 105 (FIG. 1). In such embodiments, generation process 800 may be carried out by image classifier 130.

In step 802, identification system 105 may initiate an image collection tool. For instance, identification system 105 may initiate image collector 410 (FIG. 4). In some embodiments, the image collector 410 may be a web scraper configured to collect images from websites. In other embodiments, image collector 410 may include a file synchronization tool that is connected to, for example, online resources 140. In such embodiment, image collector 410 may copy image files in a memory such as memory 450.

In step 804, identification system 105 may receive data representing a plurality of images. In step 804, identification system 105 may compress the image data or create a new file to efficiently store data of the collected images. For example, in step 804 identification system 105 may store image data in a new file in that reduces the color space to the most common colors in the image. Alternatively, identification system 105 may modify pixels in the image so they only reference an index color, or may combine pixels with dithering. Other image data compression techniques may also be used to generate new files, once the image data is received in step 804.

In some embodiments, the newly generated file at step 804 may change brightness of the image by averaging or dropping some of the chrominance information in the image. In yet other embodiments, the new file may be generated by employing a Fourier-related transform such as the Discrete Cosine Transform (DCT), wavelet transform, or Fractal compression. The new file may more efficiently store the data of the collected images to use it for generating models.

In step 806, identification system 105 may perform a preliminary search in metadata associated with the collected images. For example, identification system 105 may search for keywords in the metadata or search for XML information. Because the number of collected images used to train the machine learning algorithm may be very large, performing a preliminary search, instead of a full search in the metadata may save computer resources and accelerate the classification process.

In step 810, identification system 105 may determine whether the associated metadata includes a word of interest based on the preliminary search. If the metadata does not include a word of interest (step 810: No), identification system 105 may continue to step 812, classify the image as unlabeled, and discard it. If the metadata does include a word of interest (step 810: Yes), identification system 105 may continue to step 814 and perform a second search for features in the metadata. Such staggered search of metadata improves computer functionality by minimizing the resources required to classify images. This creates a stratified approach that quickly identifies images that are not of interest and allows the system to devote more resources to images that overcome an initial threshold. Indeed, because the determination in step 810 may be performed with specialized hardware, such as FPGAs specifically programmed to perform the keyword search in metadata, process 800 may improve the overall speed of the identification system 105.

In step 820, identification system 105 may determine whether the metadata includes information about target features. For example, in step 820 identification system may determine that the word "exterior" is in the comments section of the metadata associated with a group of images and determine that the metadata includes target features. Alternatively or additionally, identification system 105 may identify that the metadata has information about the image source and correlate it to a car maker feature.

If identification system 105 determines the metadata does not include target features (step 820: No), identification system 105 may continue to step 822 and classify the image as featureless. However, if identification system 105 determines that the metadata does include target features (step 820: yes), identification system 105 may continue to step 824 and classify the images in a labeled trained data set that may later be used to generate a convolutional neural network or an logistic regression classifier.

Figure 9:
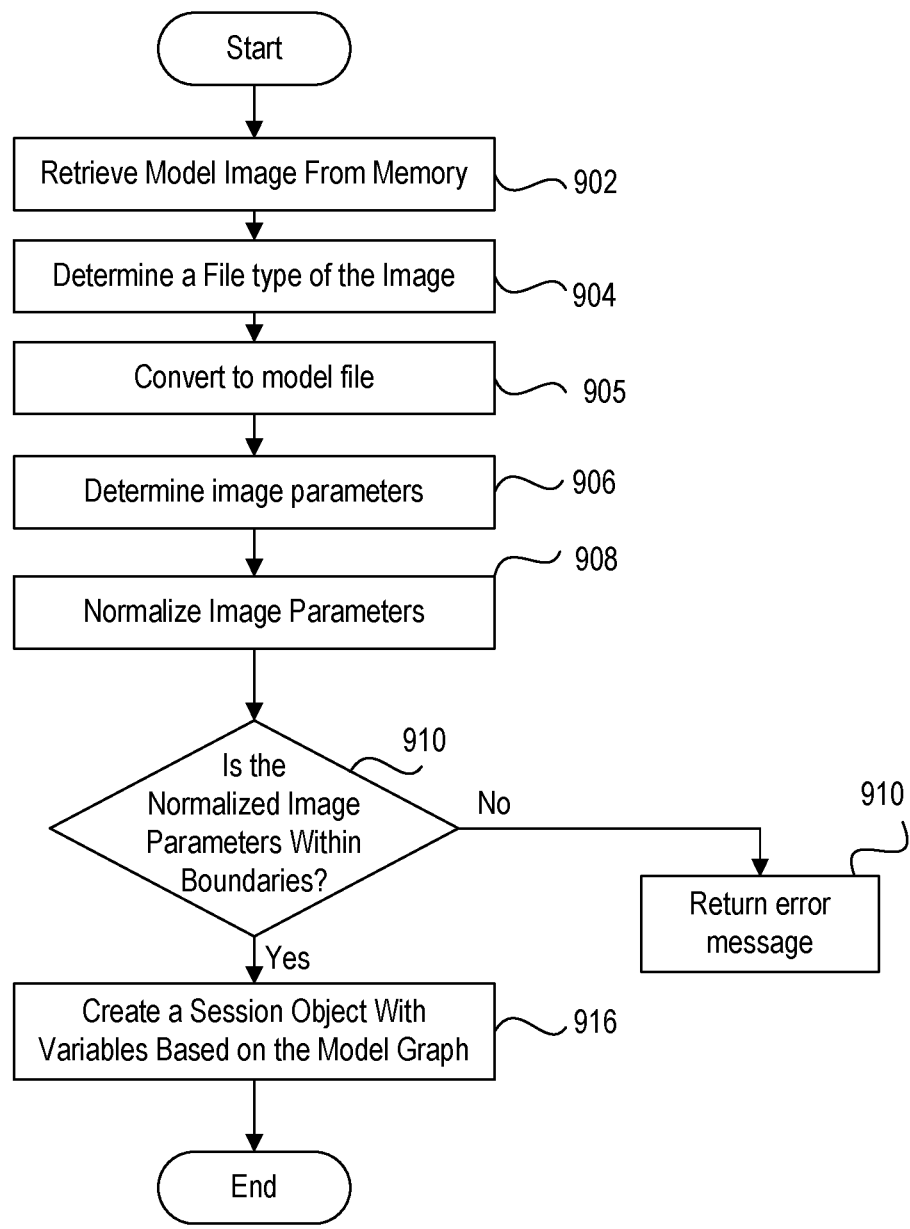
FIG. 9 is an exemplary flow chart illustrating an image normalization process, consistent with disclosed embodiments.

Referring now to FIG. 9, there is shown a flow chart of an exemplary image normalization process 900, consistent with disclosed embodiments. Normalization process 900 may be carried out by identification system 105 (FIG. 1). In some embodiments, normalization process 900 may be performed by image normalizer module 420 (FIG. 4) and image normalization module 232 (FIG. 2).

In step 902, identification system 105 may retrieve image data representing how an image may be preprocessed before going into the classifier. For example, identification system 105 may retrieve a model image data from recognizer memory 220 or classifier memory 450. The model image data may include information such as a model format and model dimensions.

In step 904, identification system 105 may determine a file type of received image data. For example, identification system 105 may identify that the image data is in JPEG format. Alternatively, identification system 105 may identify the image data is a raster format, such as GIF or TIFF. Also, identification system 105 may be configured to determine the image data is in a vector format such as CGM or XPS. In yet other embodiments, identification system may determine the image data is in a proprietary image format such as HEIC.

In step 905, identification system 105 may convert the format of the received image data from the determined file type to the model file type. In some embodiments, converting the received image data to a new format may include executing the following scripting function, where MODEL is the model format:
    import Image
    im=Image.open('test.jpg')
    im.save('test.MODEL') #or 'test.MODEL'

In step 906, identification system 105 may determine image parameters of the received image data. For example, identification system may identify parameters such as size, color, compression ratio, orientation, and components, among others.

In step 908, identification system 105 may apply operations so as to normalize parameters. For example, identification system 105 may resize the received image data, blur, crop, despeckle, dither, draw on, flip, join, and re-sample based on the parameters of the model image.

In step 910, identification system 105 may determine whether the normalized image data is within boundaries for processing. For example, after the normalization process the contrast of the image may be poor after. Because the transformation process of step 908 has degraded the quality of the image, the image data may not be suitable for processing by identification system 105. If the normalized image data is not within boundaries (step 910: No), identification system 105 may generate an error message. When an error message is generated, identification system 105 may generate a computer image that is superimposed on client device 150 notifying of the error with an augmented reality application. In addition, identification system 105 may generate an image for augmented reality presenting a picture guide such an square or line. However, if the normalized image data is within boundaries (step 910: yes), identification system 105 may continue to step 916 an create a session object in which features of the normalized image may be stored.

Figure 10:
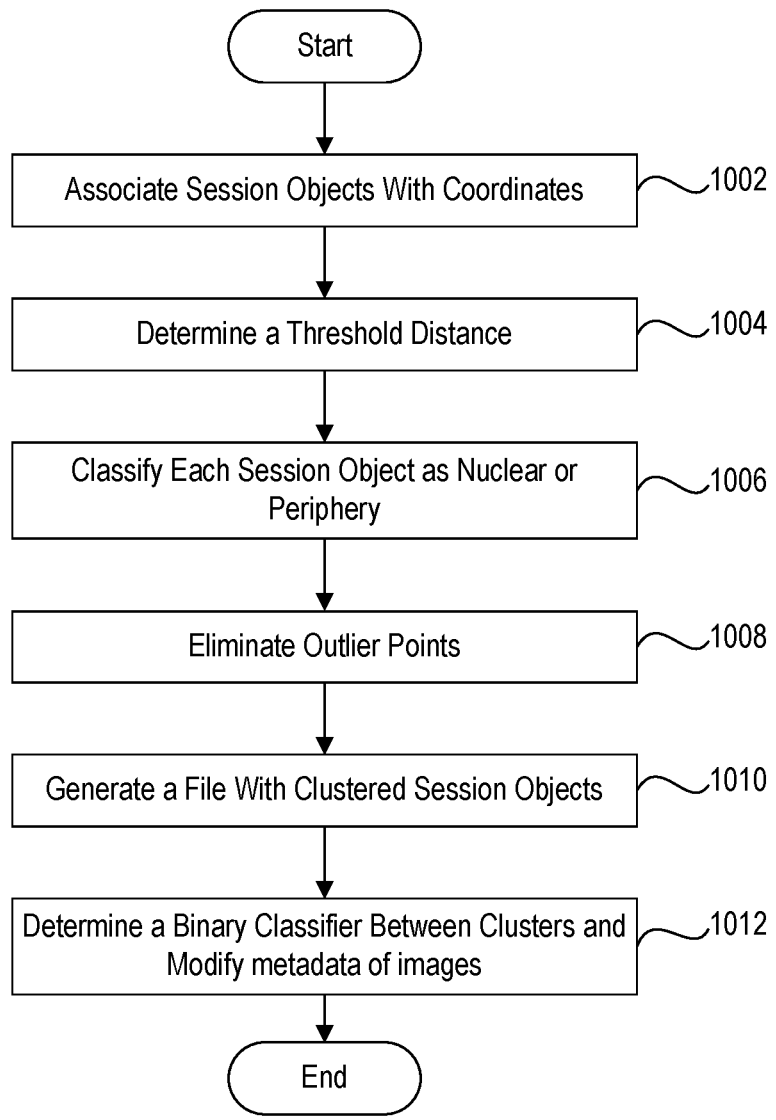
FIG. 10 is an exemplary flow chart illustrating an image classification process, consistent with disclosed embodiments.

Referring now to FIG. 10, there is shown a flow chart of an exemplary image classification process 100s0, consistent with disclosed embodiments. In some embodiments, identification system 105 may carry out model classification process 1000. For instance, in some embodiments, classification process 1000 may be performed by clustering engine 442. In such embodiments, classification process 1000 may be used to classify images of vehicles in vehicle exterior and vehicle interior. However, in other embodiments process 1000 may be used to classify images of vehicles based on model, trim, year, and/or make.

In step 1002, identification system 105 may associate images with a coordinate. For example, identification system 105 may associate the session object generated in step 916 and associate it with a coordinate.

In step 1004, identification system 105 may determine a threshold distance for classification. In some embodiments, the threshold distance may be specified by a user of the image classifier 130. In other embodiments, the threshold distance may be automatically determined based on a distance between the coordinates. In yet other embodiments, a threshold may be calculated so that the clustering algorithm only creates two groups or so that there are no outliers after the classification.

In step 1006, identification system 105 may identify each image associated with a coordinate as a nuclear image or a periphery image, based on the threshold distance. For example, identification system may determine that if a coordinate associated with an image is surrounded by more than three images within the threshold distance, then the image is a nuclear image. Further, if identification system 105 recognizes that a coordinate is not within the threshold distance of a second coordinate, it may discard the image in step 1008.

In step 1010, identification system 105 may generate a new file with data representing the clustered images. For example, identification system 105 may generate a distance matrix file that stores distance between the different images and a centroid. Alternatively, identification system 105 may prepare a file to input in a convolutional neural network. For example, identification system 105 may generate a vector of inputs for a network.

In step 1012, identification system 105 may determine a binary classifier based on the classified images. For example, identification system may perform a linear regression that segregates the two clustered groups.

Figure 11:
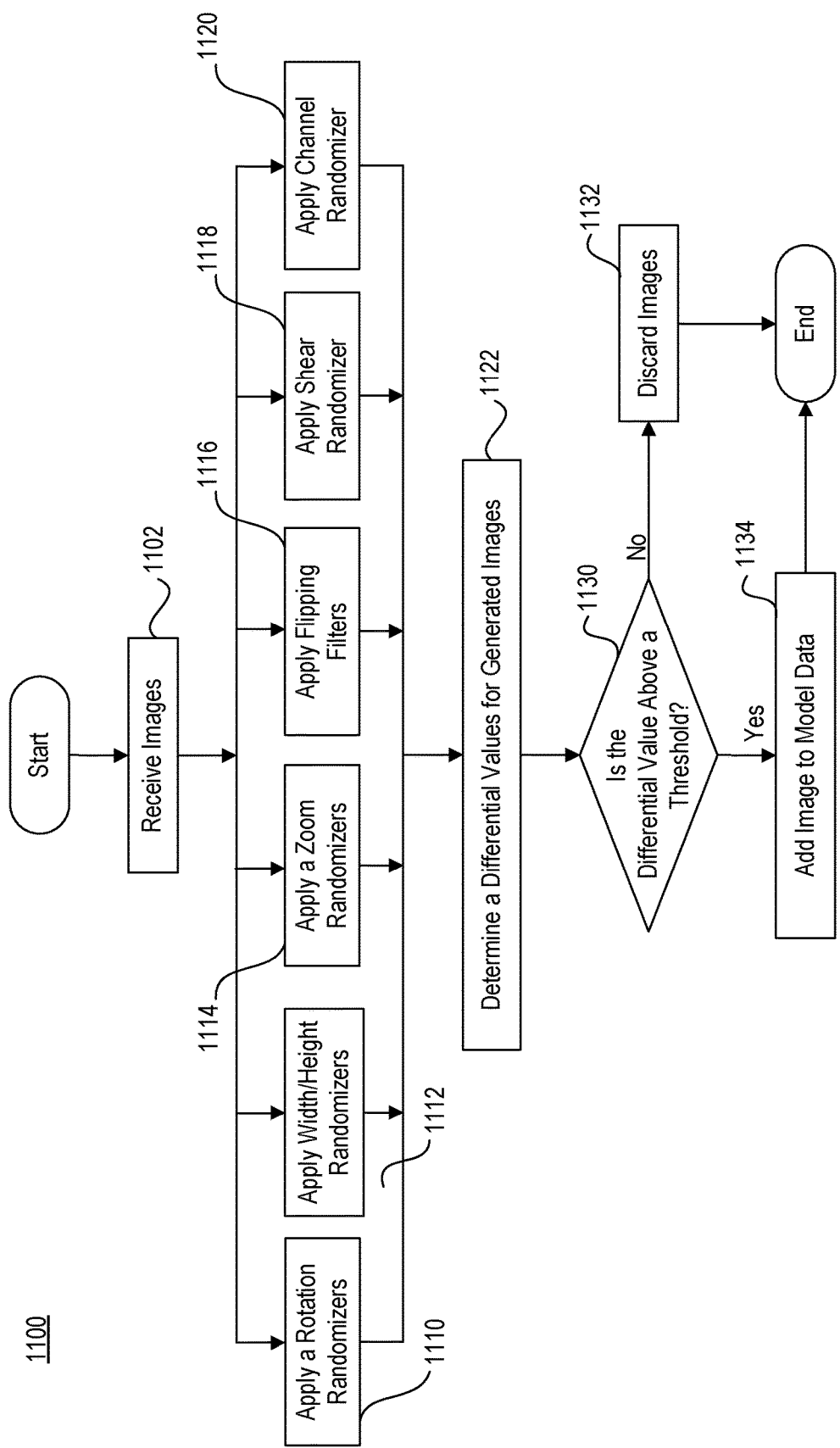
FIG. 11 is an exemplary flow chart illustrating a training image modification process, consistent with disclosed embodiments.

Referring now to FIG. 11, there is shown a flow chart of an exemplary image modification process 1100, consistent with disclosed embodiments. In some embodiments, identification system 105 may carry out image modification process 1100. In some embodiments, image modification process may be performed by image filtering 349.

Machine-learning algorithms have disadvantages when the initial image is of poor quality or has features that are not clearly distinguishable because they are very different from the images used for training. Particularly, for portable applications, in which user images can be rotated, flipped, or have uncommon picture settings, machine-learning accuracy may be limited by the quality of the initial image. To improve accuracy, image identification system 105 may perform an image modification process to generate additional training images and increase the variations in the training data set of images. New images may then be generated by applying filters to the received images to create new images. In some embodiments, the filters may be applied with a random function to cover multiple possibilities of variations in a received image. For example, a rotation filter may be applied with a random rotation between −30 degrees and +30 degrees. The actual rotation applied by the filter may be randomly selected by a random function such as "random.choice(seq)" or "random.randrange(start, stop[, step])."

The newly generated images facilitate identification of images that are taken with different cameras or with unexpected rotation or channels. For example, colored images may be encoded with three channels for RGB but have a different encoding methods. Also, when a user is taking a picture of a vehicle, the user may tilt the phone or have camera selections that are not represented in the training data set. To improve accuracy of the identification, identification system 105 may perform process 1100 to generate a larger pool of training data set of images that include images with the random parameters that the user may use when taking pictures. Particularly, for augmented reality applications in which the user may be moving the camera while the identification process takes place, the additionally generated images may improve the accuracy of the identification model.

In step 1102, identification system 105 may receive data of an image that will be used as template to generate additional images.

In steps 1110-1120, identification system 105 may apply different filters and/or randomizers to the image data and generate modified image data. The filters may include rotation, width/height, zoom, flipping, shear, or channel.

In order to prevent overloading the machine-learning algorithm with multiple images that are similar (and thus do not help to identify additional features), identification system 105 may determine a differential value between the original image and the modified images (step 1122). For example, identification system 105 may use a metric, such as average brightness, to evaluate the difference between the modified images (also named augmented images) and the original image. In some embodiments, identification system 105 may compute an average contrast of augmented images and compare it with the average contrast of the received image in step 1102. In other embodiments, identification system 105 may subtract augmented images from received images to generate a difference measurement used to compare the images. Identification system 105 may determine if the differential value is above a threshold (step 1130) and discard modified images that are not above the threshold, to prevent feeding the machine-learning algorithm similar images that do not represent additional features and would require more computer resources for processing, thereby undermining the speed of the identification model. Therefore images that are too similar to the original image (step 1132) after the modification process may be discarded. Alternatively, if in step 1130 identification system 105 determines that the differential values is above a threshold, identification system 105 may add the image to a training data set that may be used by model builder 346.

Figure 12:
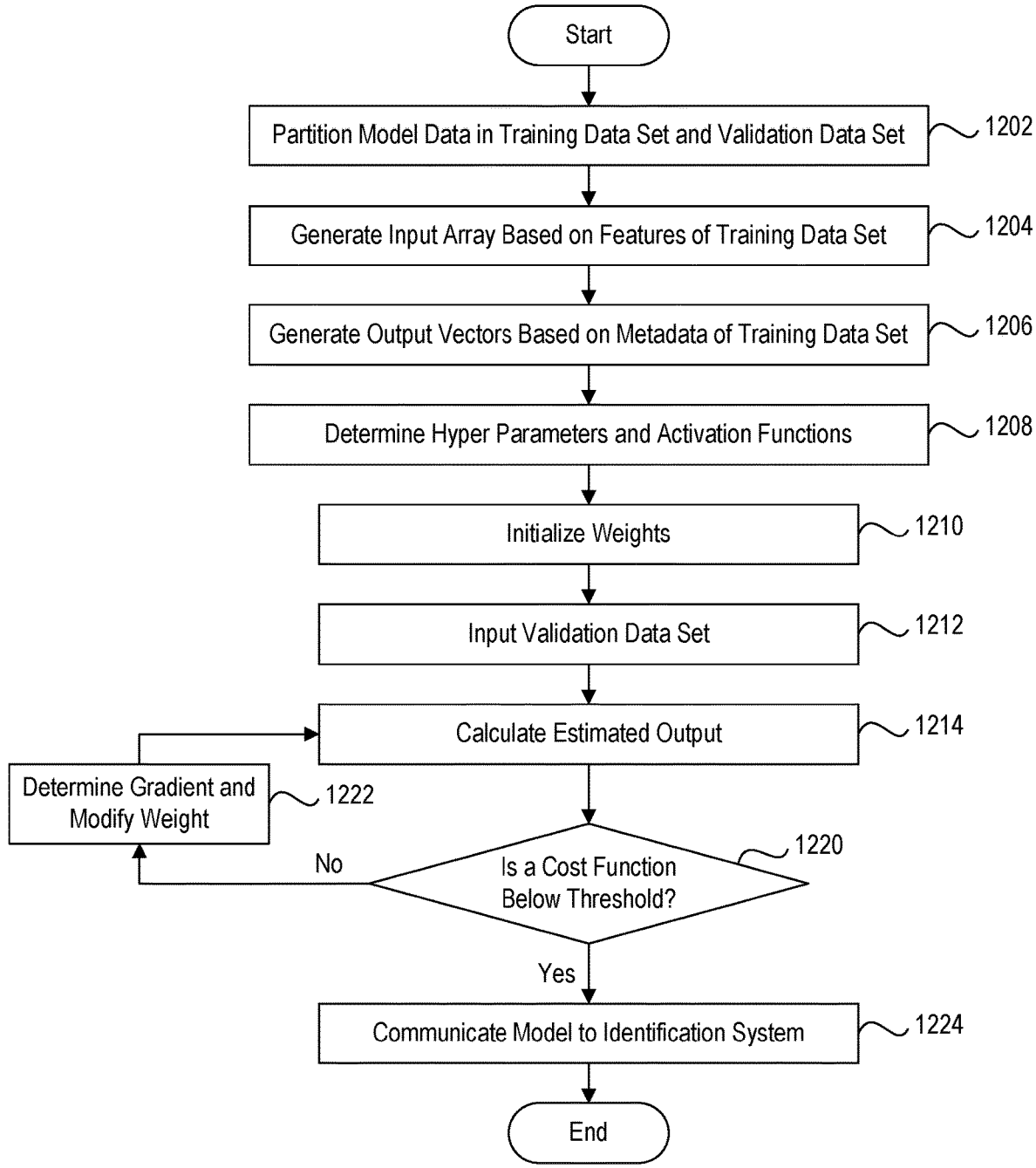
FIG. 12 is an exemplary flow chart illustrating a process for generating an identification model, consistent with disclosed embodiments.

Referring now to FIG. 12, there is shown a flow chart of an exemplary process 1200 for generating an identification model, consistent with disclosed embodiments. Process 1200 may be performed by identification system 105. For example, process 1200 may be executed by model builder 346 and may be configured to generate classification models, such as convolutional neural networks, to identify images.

In step 1202, identification system 105 may partition model data into a training data set and a validation data set. For example, identification system 105 may receive data representing a plurality of images of the exterior of vehicles. The images may be associated with metadata describing attributes of the vehicle in the image. Identification system 105 may divide the images of the exterior of the vehicles and generate two groups, one to train the convolutional neural network and a second to validate the model.

In step 1204, identification system 105 may generate an input array based on features of the training data set. For example, identification system 105 may generate a variable comprising feature information of images in the training data set.

In step 1206, identification system 105 may generate output vectors based on metadata of the training data set. For example, based on the images in the training data set, the identification system may generate a desired output vector identifying car make and model that is included in the training data set.

In step 1208, identification system 105 may determine hyper parameters and activation functions to initialize the model to be created. For example, identification system 105 may select a number of layers and nodes, and determine whether the network will be fully or partially connected. In addition, in step 1208 identification system 105 may determine the dimensionality of the network and/or determine stacks of receptive field convolution networks. Alternatively or additionally, identification system 105 may determine a pixel input resize value. In some embodiments, the selection of the pixel input resize value may be determined by a neural net architecture and the selection of the neural net architecture may be based on a required identification speed.

Moreover, in step 1208 identification system 105 may also associate the model with one or more activation functions. For example, identification system 105 may associate the model with one or more sigmoidal functions. Moreover, in step 1210 identification system 105 may initialize weights for synapsis in the network.

In step 1212, identification system 105 may apply the input array based on features of training data set of step 1204 to calculate an estimated output in step 1214 and a cost function. In step 1220, identification system 105 may determine whether the cost function is below a threshold of required accuracy, which may be specified by the user. If identification system 105 determines that the cost function is not below a threshold and the required accuracy has net being achieved, identification system 105 may continue to step 1222 and determine a gradient to modify weights in synapsis or modify the activation functions in the different nodes. However, if the cost function if below a threshold (step 1220: yes), identification system may accept the model.

Figure 13:
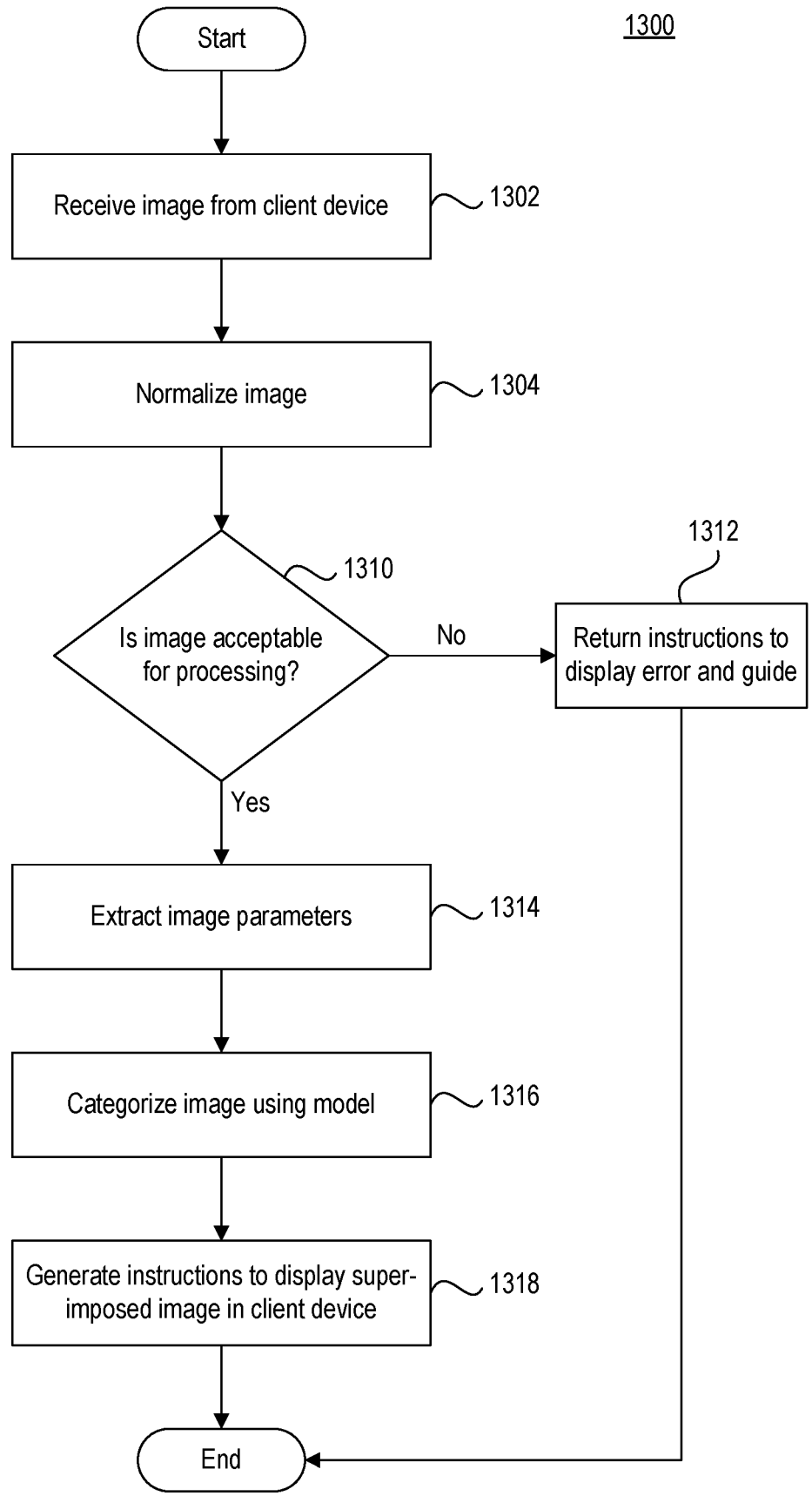
FIG. 13 is an exemplary flow chart illustrating a process for handling a request for identification, consistent with disclosed embodiments.

Referring now to FIG. 13, there is shown a flow chart of an exemplary process 1300 for handling a request for identification. In some embodiments, process 1300 may be performed by identification system 105.

In step 1302, identification system 105 may receive image data from a client device. Alternatively, identification system 105 may receive a video feed from a client device 150. In other embodiments, identification system 105 may receive the image or video data from an online resource 140.

In step 1304, identification system 105 may normalize the image data using, for example, methods previously described in connection to FIG. 9. For example, image normalization module 232 may use modify the received image data so that it resembles data of a model image.

In step 1310, identification system 105 may determine whether the image data is acceptable for processing. For example, identification system 105 may perform a validity assessment of whether the contrast in the image is high enough or if the format of the image can be processed. In some embodiments, identification system 105 may determine if the image displays a full vehicle by, for example, analyzing contrast in the image.

If the image data is not acceptable for processing (step 1310: No), identification system 105 may continue to step 1312 and return instructions to display an error message in client device 150. In some embodiments, identification system 105 may additionally return instructions to display an onscreen guide to help the user to take an acceptable image for processing. For example, identification system 105 may generate an image to superimpose on the client screen indicating an error and presenting a guide to take a subsequent image. Examples of guides to take new images are described below, with respect to FIGS. 16 and 17.

However, if the image data is acceptable for processing (step 1310: yes), identification system may continue to step 1314 and extract image features using, for example, feature extraction module 444. For example, feature extraction module 444 may import layers of a pre-trained convolutional neural network, determine features described in a target layer of the pre-trained network, and initialize a multi-class fitting model using the features in the target layer.

In step 1316, identification system 105 may request an identification model to identify attributes in the image. For example, identification system 105 may request model generator 436 provide an identification model. In some embodiments, identification engine 236 may use the identification model to identify attributes in the image. For example, identification engine 236 may apply a convolutional neural network to determine a vehicle make and model using a model generated by model generator 120.

In step 1318, identification system 105 may generate instructions to display a modified image in the client device. For example, identification system 105 may generate a display showing a new layer on top of the image, including attributes identified in step 1316. In some embodiments, identification system 105 may generate instructions to display a conversation bubble 1702 (FIG. 17) with information stating the car make and model. In other embodiments, identification system 105 may generate instructions to display the car trim level or year, and a price estimate based on information from a website of a dealer. In yet other embodiments, identification system 105 may generate instructions to display a map showing the location of dealers that offer the identified vehicle for sale, as well as pricing information.

In some embodiments, identification system 105 may additionally query online resources 140 based on the identified vehicle attributes in step 1316. For example, identification system 105 may query websites or databases to determine cost and condition associated with the identified attributes and include that information in the graphical user interface. For example, if step 1316 results in an identification of "car make=BMW" and "car model=X5," identification system 105 may send a query to an online resource, such as Kelly Blue Book®, to obtain cost and condition information. Alternatively or additionally, identification system 105 may query online resources 140, such as databases of car dealers to determine availability of vehicles with the identified attributes. When the online resources 140 indicate that the vehicle is available, identification system 105 may request a location of the client device 150, and generate a graphical user interface displaying a map with directions to a car dealer where a vehicle with the identified attributes is available.

Figure 14:
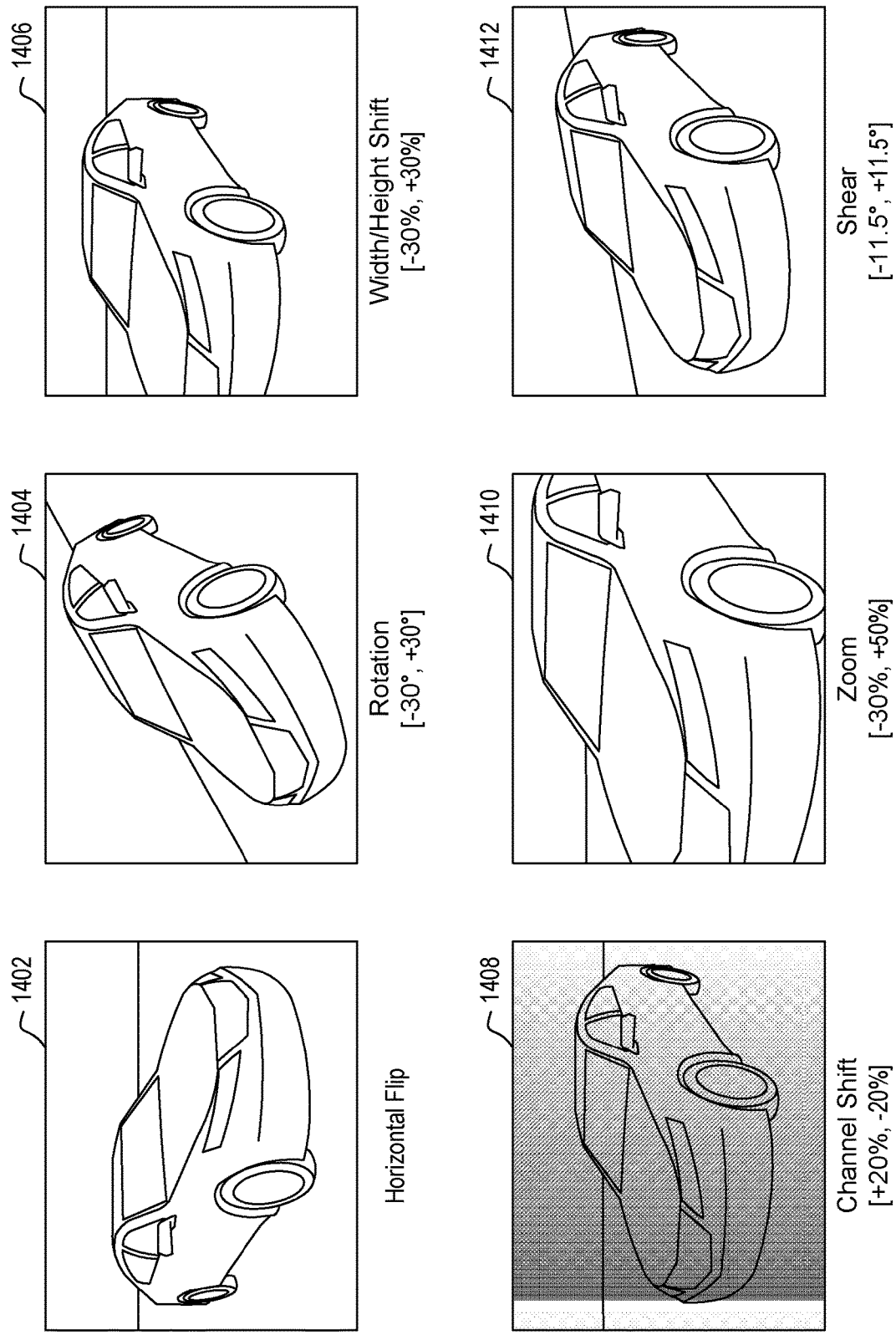
FIG. 14 is a group of exemplary graphs presenting image randomizer filters, according with disclosed embodiments.

Referring now to FIG. 14, there is shown a group of exemplary illustrations presenting image filters, consistent with disclosed embodiments. These image filters may be applied to an image in a training data set to generate additional training images. For example, identification system 105 may generate augmented images based on images that are labeled as "vehicle exterior" using one of the filters presented in FIG. 14. Expanding the training data set selection may improve model identification accuracy by minimizing differences between a received image and the training images. For example, when a user with a smartphone takes a photo, the photo may be tilted or flipped when compared with images scraped from a website. Identification system 105 may increase the training data set group of images by filtering images with image filtering 349. In some embodiments, the parameters applied to the filters may be associated with a random function. For example, the zoom ratio applied to the image may be between −50% and +50%. In some embodiments the applied zoom ratio may be selected with a random function.

Illustrations in FIG. 14 show application of a plurality of filters, including a horizontal flip 1402, a rotation 1404, and a width-height shift 1406. These filters may be used on an original image to generate additional training images for the data set. The filters may be associated with random functions such as random.gauss(mu, sigma).

Images in FIG. 14 additionally show application of a channel shift filter 1408, a zoom filter 1410, and a shear filter 1412. These images broaden the pool of images that the machine learning algorithm may use to associate image features with car attributes and facilitate identification of vehicles when client or user images have poor quality.

Figure 15:
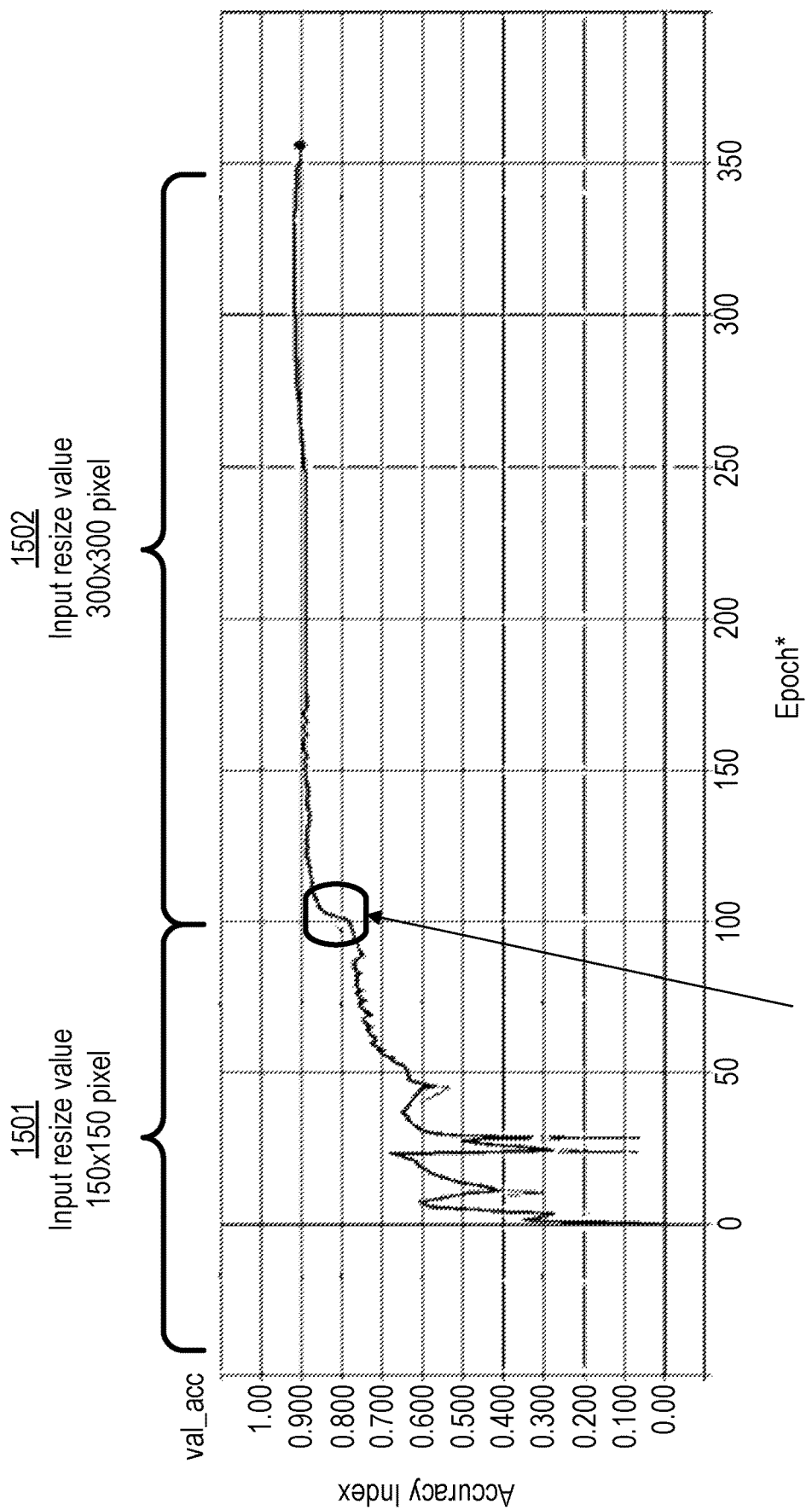
FIG. 15 is an exemplary plot correlating identification accuracy on validation data and epoch, according with disclosed embodiments.

Referring now to FIG. 15, there is shown an exemplary graph correlating identification accuracy on validation data and epoch, consistent with disclosed embodiments. As used herein, "epoch" refers the number of times a model sees, or iterates through the training set or a part of the training set.

Identification system 105 may achieve different levels of accuracy depending on the input resize value of images in the training data set and the number of epoch that the identification system 105 takes to generate the model. While some neural net architectures require resizing training images to a specific size, other neural net architectures allow to choose the desired size. For example, networks such as Inception-v3 allow user to select the resizing for training images. In some embodiments, identification system 105 may require a 224×224 pixel size.

For example, FIG. 15 shows input resize values of 150×150 or 300×300 pixels and an associated accuracy. In some embodiments, identification system 105 may resize or scale training images to these sizes before they are used to develop the model. For instance, in some embodiments if an original image is 640×480, identification system 105 may rescale the image to 150×150 and only the resized pixels are used to generate the identification model. In such embodiments, only the resized images are used to train a convolutional neural network. In other embodiments, identification system 105 may determine the input resize value may be limited to 224×224 pixels. In yet other embodiments, the input resize value may be selected by identification system 105 depending on a desired model performance. For example, identification system 105 may select a large input resize value to provide the model training with more data so it can perform better.

FIG. 15 shows an exemplary graphic describing the influence of Epoch and input resize value on the model's accuracy index. FIG. 15 shows that while Epoch is the main variable influencing the model's accuracy (i.e., a greater Epoch results in greater accuracy), the input resize value also influences the model's accuracy. For instance, FIG. 15 shows that around Epoch 100, the input size value was modified from 150×150 to 300×300. Because the input size value was modified, FIG. 15 shows a sudden change in accuracy around Epoch 100. The trend change of improved accuracy in Epoch 100 shows the effect of increasing the input resize value in the model's accuracy.

Moreover, the selection of hardware to identify the images and train the model may also be determined based on the input resize value and desired model accuracy. For example, if there are applications requiring fast response to train a model but sustain a high accuracy, identification system 105 may connect with computing clusters 160, so computing clusters 160 may conduct the required training with a large input resize value but quickly go through the training data set Referring now to FIG. 16, there is shown a group of exemplary graphical user interfaces 1601, 1611, 1621, and 1631 capturing vehicle images, consistent with disclosed embodiments. In some embodiments, graphical user interfaces may be displayed in client devices 150 and may take the image captured by camera 620 and modify it to include elements displayed in the GUI.

In some embodiments, graphical user interfaces may be displayed when a user opens an application activating camera 620 in client device 150.

Graphical user interface 1601 shows an interfaces with a vehicle within a rectangular guide 1603, a picture guide 1604, and a displayed message 1602. In some embodiments, identification system 105 may generate a new layer with rectangular guide 1603 after the image is being accepted in, for example, step 1310. Rectangular guide 1603 may be rendered in a color selected to highly contrast with the original image. Similarly, picture guide 1604 may be generated when identification system 105 determines that the picture quality is poor and cannot be processed. In some embodiments, picture guide 1604 may be displayed when identification system 105 returns instructions to display a view guide (step 1312). In addition, identification system 105 may generate displayed message 1602 instructing a user of client device 150 to adjust camera 620 to position the vehicle in a better position so the image can be accepted.

While graphical user interface shows a guide 1604 and message 1602 in the bottom, the guide and message may also be on the top, similar to guide 1613 and message 1612, or also in the side, similar to guide 1622. Therefore, graphical user interfaces 1611 and 1621 show alternative graphical user interfaces with similar elements arranged in different positions. Identification system 105 may select the position of elements in the graphical user interface to facilitate interactions with the user.

In other embodiments, the graphical user interface may modify an image of a vehicle by including a first guide 1635 and a second guide 1634. For example, graphical user interface 1631 presents the side of the vehicle, along with a displayed message 1632 to position the front and back of the vehicle between the first guide 1635 and second guide 1634.

Figure 17:
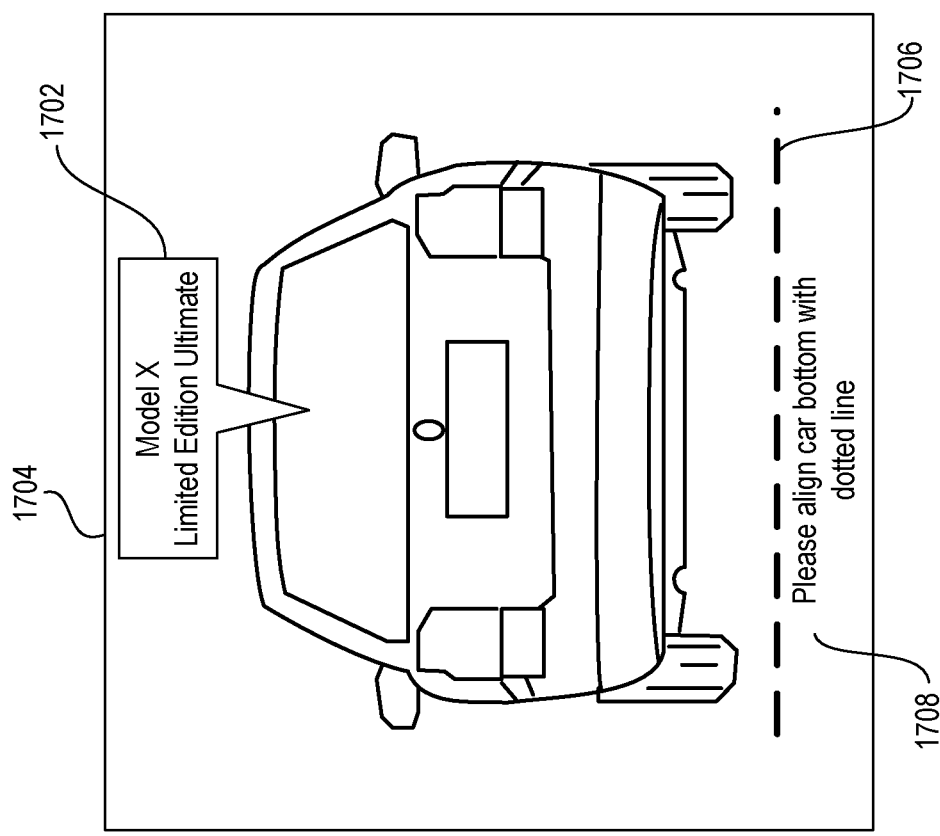
FIG. 17 is an exemplary graphical user interface showing a display of identification information, according with disclosed embodiments.

Referring now to FIG. 17, there is shown an exemplary graphical user interface 1704, showing a display of identification information, consistent with disclosed embodiments. In some embodiments, graphical user interface 1704 may be displayed when identification system 105 successfully identifies attributes in a received image.

In some embodiments, when identification system 105 generates instructions to display a modified image in the client device after categorizing the image with the attribute identification function, at step 1318, identification system 105 may generate a graphical user interface including an identification layer comprising information of the identified vehicle.

For example, the modified graphical user interface may include a bubble 1702 listing a model type and trim level associated with the identified vehicle. Bubble 1702 may additionally present information of vehicle make, cost, and condition. In such embodiments, graphical user interface 1704 may include a picture guide 1706 and a displayed message 1708. In some embodiments, graphical user interface 1704 may be displayed as augmented reality in the client devices 150. In such embodiments, bubble 1702 may be deleted once identification system 105 determines the image does not longer correspond to a vehicle.

Another aspect of the disclosure is directed to a non-transitory computer-readable medium storing instructions that, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage unit or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods. It is intended that the specification and examples be considered as exemplary only, with a true scope being indicated by the following claims and their equivalents.

What is claimed is:

1. An apparatus comprising:
at least one processor; and
at least one memory device storing instructions that, when executed by the at least one processor, cause the at least one processor to perform operations comprising:
obtaining first images, the first images being associated with first metadata indicating whether the first images correspond to at least one of a vehicle interior or a vehicle exterior;
determining a classification function that classifies the first images into at least one of a vehicle interior group or a vehicle exterior group based on first features extracted from the first images;
classifying second images using the classification function into at least one of the vehicle interior group, the vehicle exterior group, or an unclassified group, the second images being associated with second metadata indicating at least one of a maker or a model;
categorizing the second images in the vehicle exterior group by attributes based on second features extracted from the second images; and
determining an attribute identification function that identifies attributes of the second images based on the second features and the second metadata.

2. The apparatus of claim 1, wherein the operations further include extracting the first features from the first images.

3. The apparatus of claim 2, wherein extracting the first features comprises:
transmitting the first images to a cluster comprising processing units configured to extract image features, the processing units being in communication through fast local area networks; and
receiving, from the cluster, data associated with the first features.

4. The apparatus of claim 2, wherein extracting the first features comprises:
converting the at least one of the first images to an image in a model file type; and
extracting at least one first feature from the converted image.

5. The apparatus of claim 1, wherein the operations further include modifying metadata associated with at least one image in the first images to include a label representing a group in which the at least one image is classified.

6. The apparatus of claim 5, wherein the label comprises a binary label identifying one of the vehicle interior group or the vehicle exterior group.

7. The apparatus of claim 1, wherein the classification function comprises a binary logistic regression function.

8. The apparatus of claim 1, wherein the operations further include classifying the first images into at least one of the vehicle interior group or the vehicle exterior group.

9. The apparatus of claim 1, wherein classifying the first images comprises:
associating coordinates with each of the first images based on its corresponding first features;
establishing core points based on distances between the associated coordinates of pairs of the first images;
iteratively clustering coordinates that are within a threshold distance from at least one core point; and
eliminating one or more of the first images associated with coordinates that are not clustered with at least one core point.

10. The apparatus of claim 1, wherein the second images comprise one or more images associated with a vehicle, at least one of the second images being different from at least one of the first images.

11. The apparatus of claim 1, wherein the attribute identification function identifies at least one of a vehicle make, a vehicle model, a vehicle year, or a vehicle trim.

12. The apparatus of claim 1, wherein obtaining the first images comprises initiating a web scraper configured to collect images from websites of vehicle dealers or vehicle manufacturers.

13. The apparatus of claim 12, wherein the web scraper is configured to perform a keyword search in metadata of images.

14. The apparatus of claim 1, wherein the operations further comprise:
identifying, using the attribute identification function, at least one attribute associated with a target image.

15. The apparatus of claim 14, wherein the operations further comprise:
receiving the target image from a user device.

16. The apparatus of claim 14, wherein identifying, using the attribute identification function, the at least one attribute associated with the target image comprises:

extracting one or more features from the target image;

inputting the one or more extracted features from the target image into the attribute identification function; and receiving the at least one attribute as an output from the attribute identification function.

17. The apparatus of claim 14, wherein the at least one attribute associated with the target image comprises at least one of a vehicle make, a vehicle model, a vehicle year, or a vehicle trim.

18. The apparatus of claim 14, wherein the operations further comprise:

obtaining, based on the at least one attribute associated with the target image, information relating to a vehicle; and transmit the obtained information to a user device.

19. A method, comprising:

obtaining first images, the first images being associated with first metadata indicating whether the first images correspond to at least one of a vehicle interior or a vehicle exterior;

determining a classification function that classifies the first images into at least one of a vehicle interior group or a vehicle exterior group based on first features extracted from the first images;

classifying second images using the classification function into at least one of the vehicle interior group, the vehicle exterior group, or an unclassified group, the second images being associated with second metadata indicating at least one of a maker or a model;

categorizing the second images in the vehicle exterior group by attributes based on second features extracted from the second images; and determining an attribute identification function that identifies attributes of the second images based on the second features and the second metadata.

20. A non-transitory computer-readable medium storing instructions that, when executed by at least one processor, cause the at least one processor to perform operations comprising:

determining a classification function that classifies first images into at least one of a vehicle interior group or a vehicle exterior group based on first features extracted from the first images;

classifying second images using the classification function into at least one of the vehicle interior group, the vehicle exterior group, or an unclassified group;

categorizing the second images in the vehicle exterior group by attributes based on second features extracted from the second images;

determining an attribute identification function that identifies attributes of the second images based on the second features; and identifying, using the attribute identification function, at least one attribute associated with a target image.

* * * * *